(12) United States Patent
Rybka et al.

(10) Patent No.: US 8,549,971 B2
(45) Date of Patent: Oct. 8, 2013

(54) LAMINATE FLOORING SAW

(75) Inventors: Matthew M. Rybka, Hoffman Estates, IL (US); Christopher Heflin, Oak Park, IL (US); P. Sean Gallagher, Arlington Heights, IL (US)

(73) Assignee: Robert Bosch GmbH, Stuttgart (DE)

( * ) Notice: Subject to any disclaimer, the term of this patent is extended or adjusted under 35 U.S.C. 154(b) by 555 days.

(21) Appl. No.: 12/688,121

(22) Filed: Jan. 15, 2010

(65) Prior Publication Data
US 2010/0116111 A1 May 13, 2010

Related U.S. Application Data

(63) Continuation-in-part of application No. 12/199,604, filed on Aug. 27, 2008, now Pat. No. 8,186,257.

(51) Int. Cl.
*B27B 5/18* (2006.01)
*B27B 5/29* (2006.01)

(52) U.S. Cl.
USPC .......................................... 83/471.3; 83/821

(58) Field of Classification Search
USPC ............... 83/471.1, 471.2, 477.1, 477.2, 442, 83/438, 455–466, 473, 581, 821; 30/517–525, 371–391; D8/64, 66, 67, D8/68
See application file for complete search history.

(56) References Cited

U.S. PATENT DOCUMENTS

| | | | | |
|---|---|---|---|---|
| 2,719,547 A * | 10/1955 | Gjerde | ........................ | 83/471.3 |
| 3,901,498 A * | 8/1975 | Novak | ............................ | 269/81 |
| 4,096,777 A * | 6/1978 | Adams | ............................ | 83/762 |
| 4,186,784 A * | 2/1980 | Stone | ......................... | 144/253.2 |
| 4,206,910 A | 6/1980 | Biesemeyer | | |
| 4,320,678 A * | 3/1982 | Volk | ................................ | 83/574 |
| 4,350,066 A * | 9/1982 | Volk | ................................ | 83/763 |
| 4,378,716 A * | 4/1983 | Volk | ................................ | 83/438 |
| 4,510,834 A * | 4/1985 | Greene et al. | ................... | 83/453 |
| 4,630,656 A * | 12/1986 | Collins | ....................... | 144/154.5 |
| 4,658,687 A | 4/1987 | Haas et al. | | |
| 4,920,845 A * | 5/1990 | Blanchette | ...................... | 83/574 |
| 4,972,748 A * | 11/1990 | Walsh | ......................... | 83/468.3 |
| 5,090,283 A | 2/1992 | Noble | | |
| 5,353,670 A * | 10/1994 | Metzger, Jr. | ................. | 83/471.3 |
| 5,797,307 A * | 8/1998 | Horton | ........................ | 83/471.3 |
| 5,823,239 A * | 10/1998 | Smith | ......................... | 144/135.2 |
| 5,964,041 A * | 10/1999 | Daniel | ........................... | 33/403 |
| 6,021,700 A | 2/2000 | Garuglieri | | |
| 6,067,885 A | 5/2000 | Brunson et al. | | |
| 6,119,676 A | 9/2000 | Greenland | | |
| 6,305,449 B1 * | 10/2001 | Stover | .......................... | 144/371 |
| 6,561,068 B2 | 5/2003 | Meredith et al. | | |
| 6,679,305 B2 * | 1/2004 | Petersen | .................... | 144/253.1 |
| 6,782,783 B2 | 8/2004 | Shull et al. | | |
| 6,886,440 B2 | 5/2005 | Parks et al. | | |
| 6,899,004 B1 | 5/2005 | Miller | | |
| 6,932,074 B2 * | 8/2005 | Cheng et al. | ............... | 125/13.01 |

(Continued)

*Primary Examiner* — Sean Michalski

(74) *Attorney, Agent, or Firm* — Maginot, Moore & Beck

(57) ABSTRACT

A laminate flooring saw system which can be used for both rip cuts and miter cuts in one embodiment includes a fence, a base including a first locking member configured to cooperate with the fence to lock the fence along a first fence axis, a second locking member configured to cooperate with the fence to lock the fence along a second fence axis, the second fence axis perpendicular to the first fence axis, and a support arm system positioned above the base for supporting a power tool.

9 Claims, 19 Drawing Sheets

(56) References Cited

U.S. PATENT DOCUMENTS

| | | | |
|---|---|---|---|
| 6,959,632 B2 * | 11/2005 | Lee | 83/435.14 |
| 6,971,297 B1 | 12/2005 | Meredith et al. | |
| 7,066,627 B1 * | 6/2006 | Chen | 362/259 |
| D536,945 S * | 2/2007 | Yang | D8/98 |
| D602,053 S * | 10/2009 | Heflin et al. | D15/133 |
| 7,810,482 B2 * | 10/2010 | Gifford et al. | 125/13.01 |
| 7,810,483 B2 * | 10/2010 | Gifford et al. | 125/13.01 |
| D638,864 S * | 5/2011 | Comas | D15/127 |
| 7,946,906 B2 * | 5/2011 | Gifford et al. | 451/8 |
| 2003/0150311 A1 * | 8/2003 | Carroll et al. | 83/471.3 |
| 2004/0003696 A1 * | 1/2004 | Radda | 83/437.1 |
| 2004/0020342 A1 * | 2/2004 | Wattenbach | 83/860 |
| 2004/0163524 A1 * | 8/2004 | Erisoty | 83/581 |
| 2006/0011033 A1 * | 1/2006 | Rossetti et al. | 83/471.3 |
| 2007/0214926 A1 * | 9/2007 | Ceroll et al. | 83/471 |
| 2008/0053284 A1 | 3/2008 | Miller et al. | |
| 2008/0236355 A1 | 10/2008 | Gass et al. | |
| 2010/0186567 A1 * | 7/2010 | Wiezorek | 83/471.3 |
| 2010/0263511 A1 * | 10/2010 | Firth | 83/473 |
| 2012/0011977 A1 * | 1/2012 | Singer et al. | 83/471.2 |

* cited by examiner

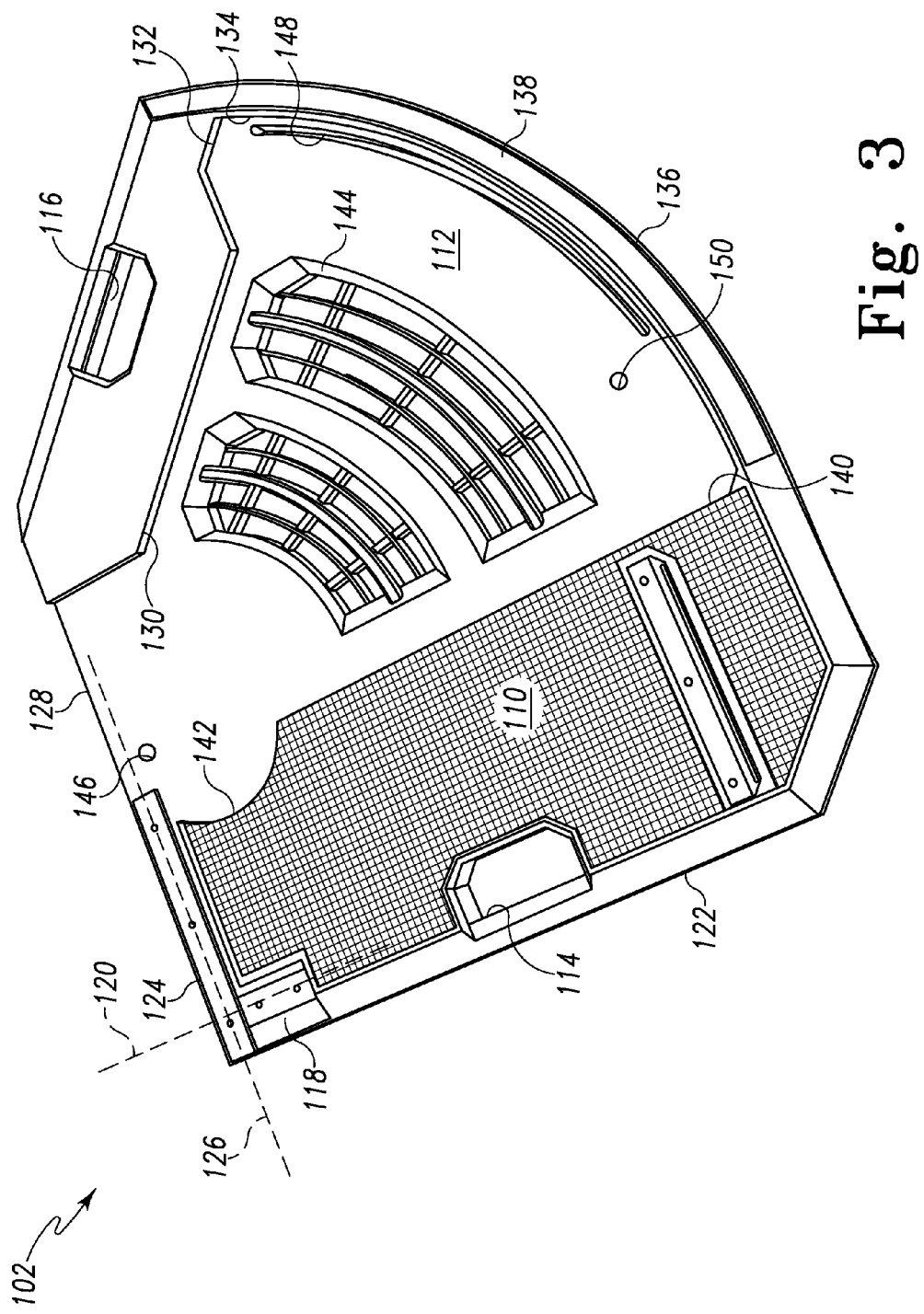

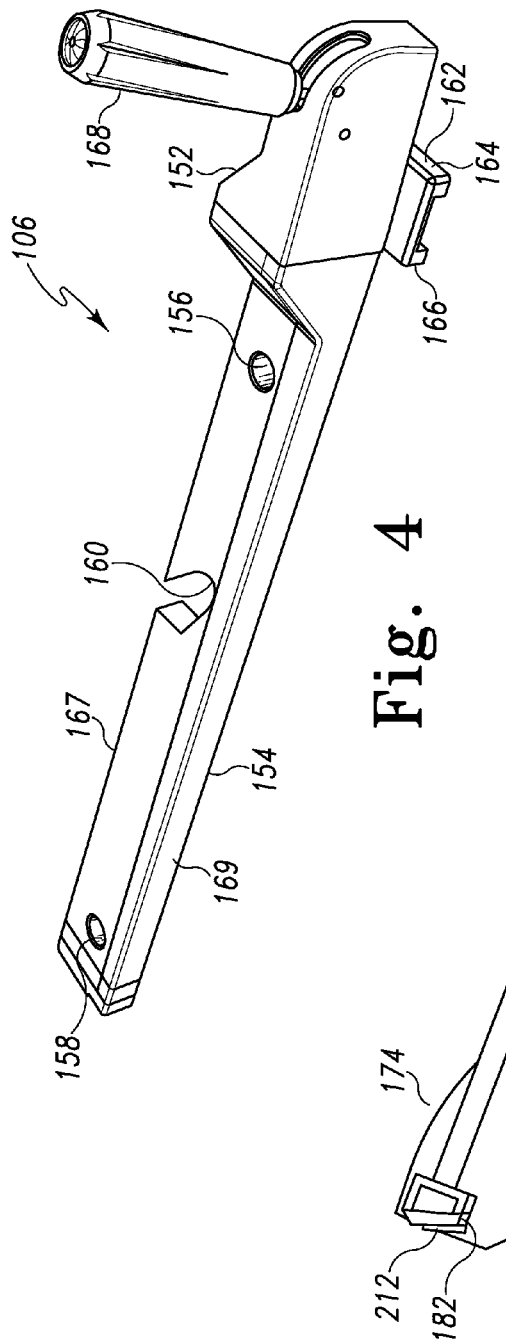

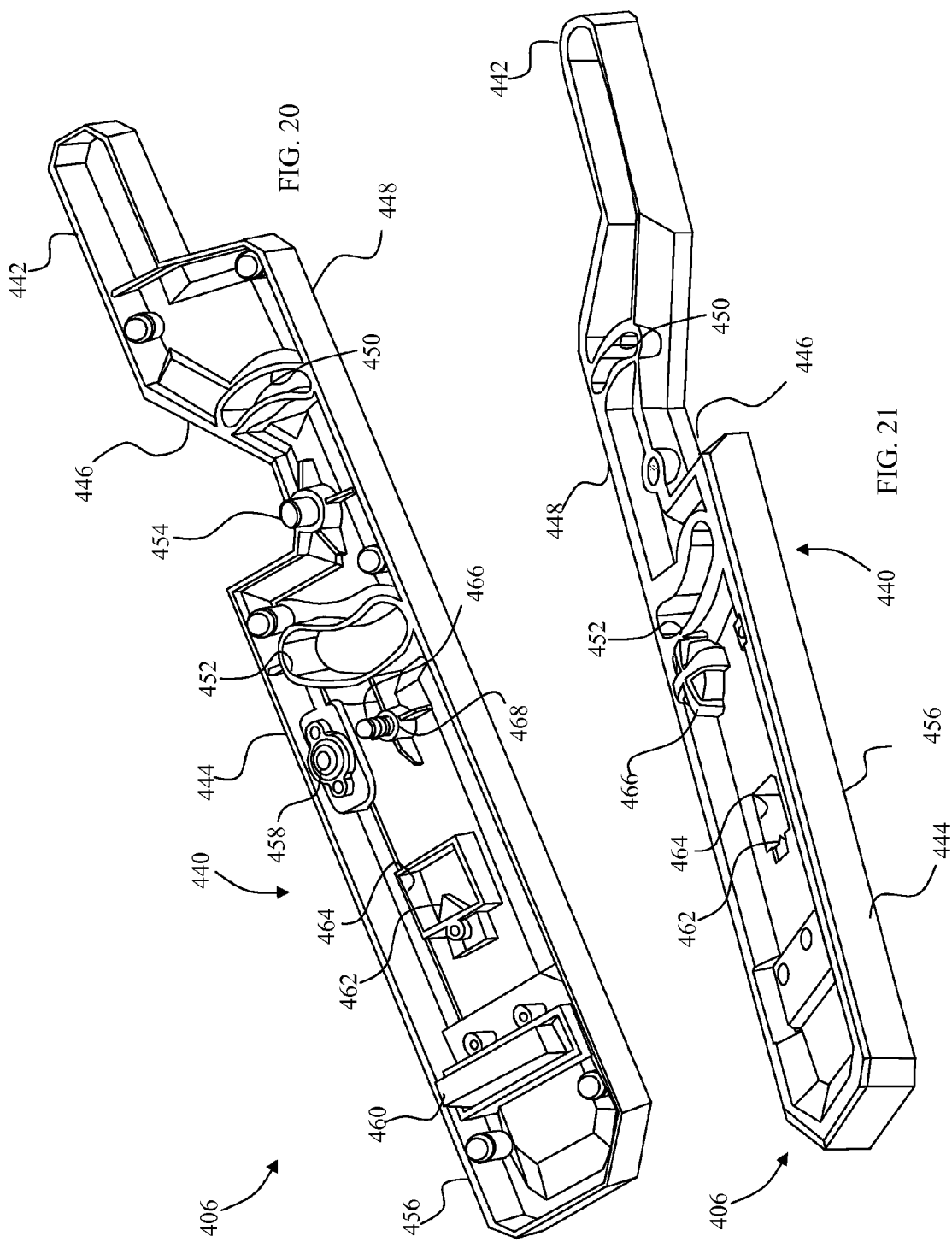

LAMINATE FLOORING SAW

This application is a continuation-in-part of co-pending U.S. patent application Ser. No. 12/199,604, filed on Aug. 27, 2008, and is related to U.S. patent application Ser. No. 12/688,093 filed Jan. 15, 2010, the entire contents of which are herein incorporated by reference.

FIELD OF THE INVENTION

This invention relates to the field of devices used to support and shape work-pieces and particularly to a device for supporting and cutting work-pieces.

BACKGROUND

Laminate flooring is a popular flooring product due to its ease of installment as well as its performance. Additionally, the various designs which are available for laminate flooring enhance its popularity with consumers. The designs include wood-grain patterns, slate, marble, mosaic, and granite. Additionally, a number of specialized products have been designed to ease installation of laminate flooring. Such products include transition strips, end caps, stair nosings, moldings and baseboards.

When laminates were first introduced, there was only one method of installation. The laminates were produced in a "tongue and groove" design. When installing the laminate, the tongue and grooves were glued together, then clamped and left to dry. Manufacturers have since developed flooring that requires no glue at all.

Accordingly, installation of laminate flooring has been significantly simplified. One difficult aspect of installation that remains, however, is cutting the laminate flooring to fit within a particular area. Most laminates are provided in planks that are 7-8 inches wide and about 4 foot long. Depending upon the width of a room, the final course of planks may need to be ripped to the appropriate width. Moreover, the lengths of the planks at opposing walls need to be trimmed. Additionally, miter cuts may be required to contour the planks to fit the contours of a particular room.

Traditionally, a number of different types of saws have been used to make the necessary miter and rip cuts in laminate floors. Such saws include table saws, hand saws, jig saws and circular saws. Each of these types of saws provides some advantages. A table saw gives very precise cuts and can be used to rip cut a work-piece. Additionally, table saws can be configured to provide angled cuts by angling the work-piece. Table saws, even the "portable" table saws, however, are large and heavy. Thus, an installer must either accept the difficulty in transporting the table saw near the area where the laminate is to be installed or carry each piece of laminate back and forth from the work area to the saw location. Additionally, many homeowners attempt to install a laminate floor on their own. In the event the homeowner does not own a table saw, a different approach is needed.

Hand saws are, in stark contrast to table saws, extremely mobile. Hand saws are also, however, labor intensive. Thus, while handsaws may reasonably be used to make cuts of a few feet, the large number of planks that may need to be cut for a particular installation presents a daunting challenge to those using handsaws. Moreover, handsaws are generally not as accurate as table saws.

Jig saws and circular saws are generally much more "portable" than table saws and greatly facilitate making a large number of cuts. Depending upon the particular jigs available to an installer, however, these saws still do not provide the accuracy achievable with a table saw. Thus, while professional installers may become very skilled with using a jig saw or circular saw, other users may generate an undesired amount of scrap as a result of erroneous cuts.

What is needed is a system which can be used to rip cut a work piece and to miter cut the work piece. What is further needed is a system which is portable so that it can be located at a work site. A further need is for a system that can provide the required portability while providing accurate cuts.

SUMMARY

In accordance with one embodiment of the present invention, there is provided a laminate flooring saw system including a fence, a base including a first locking member configured to cooperate with the fence to lock the fence along a first fence axis, a second locking member configured to cooperate with the fence to lock the fence along a second fence axis, the second fence axis perpendicular to the first fence axis, and a support arm system positioned above the base for supporting a power tool.

In another embodiment, a portable saw system includes a base with a first locking member and a second locking member, a support arm system defining a cutting axis, a power tool supported by the support arm system and movable along the cutting axis, and a fence with a first side defining a first guide and a second side opposite to the first side and defining a second guide, wherein the first guide includes a cutout portion, the fence (i) configured to couple with the first locking member such that the cutout portion is aligned with the cutting axis and (ii) configured to couple with the second locking member such that the second guide is parallel with the cutting axis.

BRIEF DESCRIPTION OF THE DRAWINGS

FIG. 3 depicts the base of the laminate flooring saw system of FIG. 1 with the fence and articulating support structure removed;

FIG. 4 depicts a perspective view of the fence of the laminate flooring saw system of FIG. 1;

FIG. 5 depicts a top plan view of the articulating support structure of the laminate flooring saw system of FIG. 1;

FIG. 20 depicts a bottom perspective view of the fence of the laminate flooring saw system of FIG. 18;

FIG. 21 depicts a top perspective view of the fence of the laminate flooring saw system of FIG. 18;

DESCRIPTION

Figure 1:
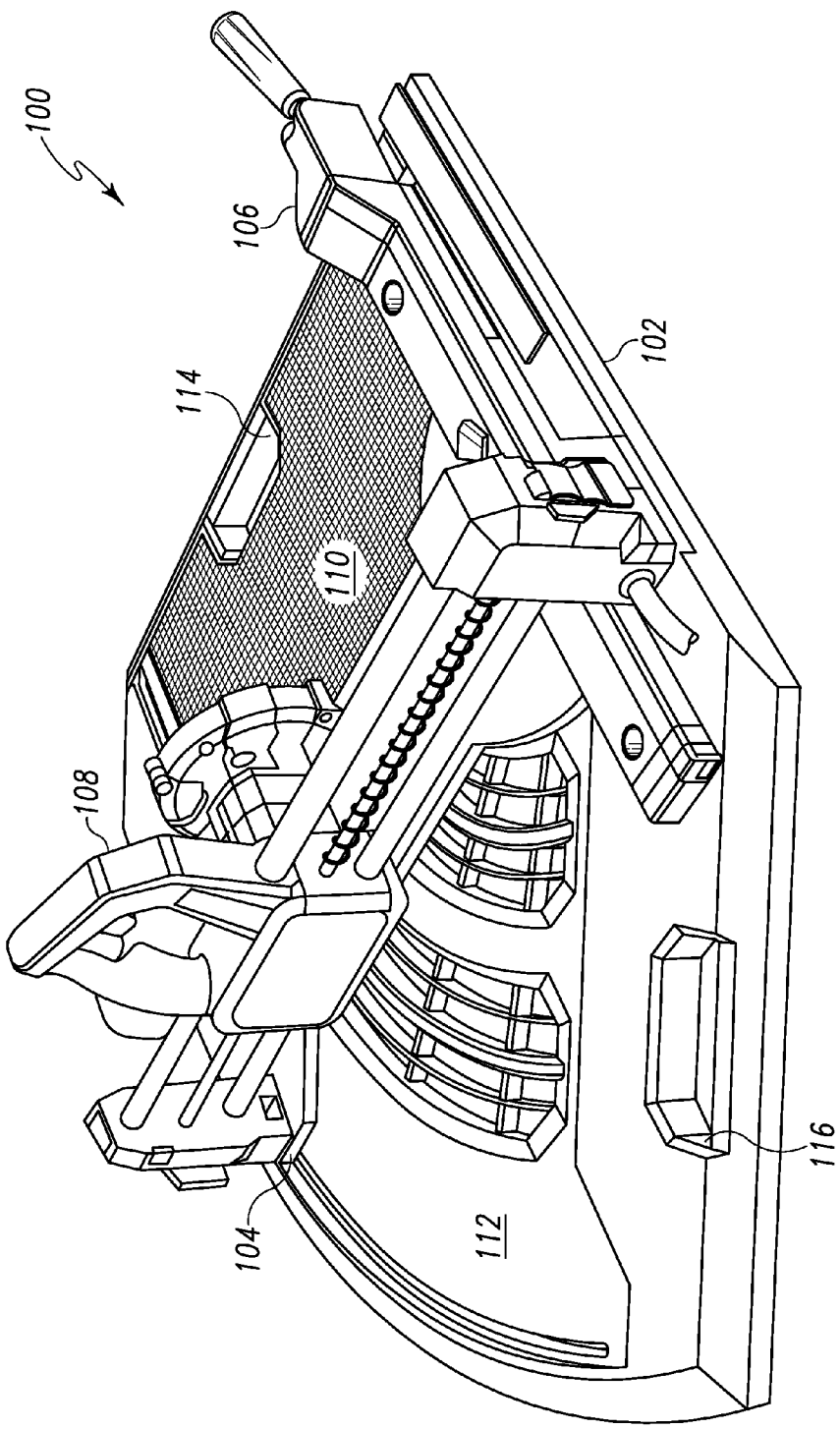
FIG. 1 depicts a perspective view of a laminate flooring saw system in accordance with principles of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
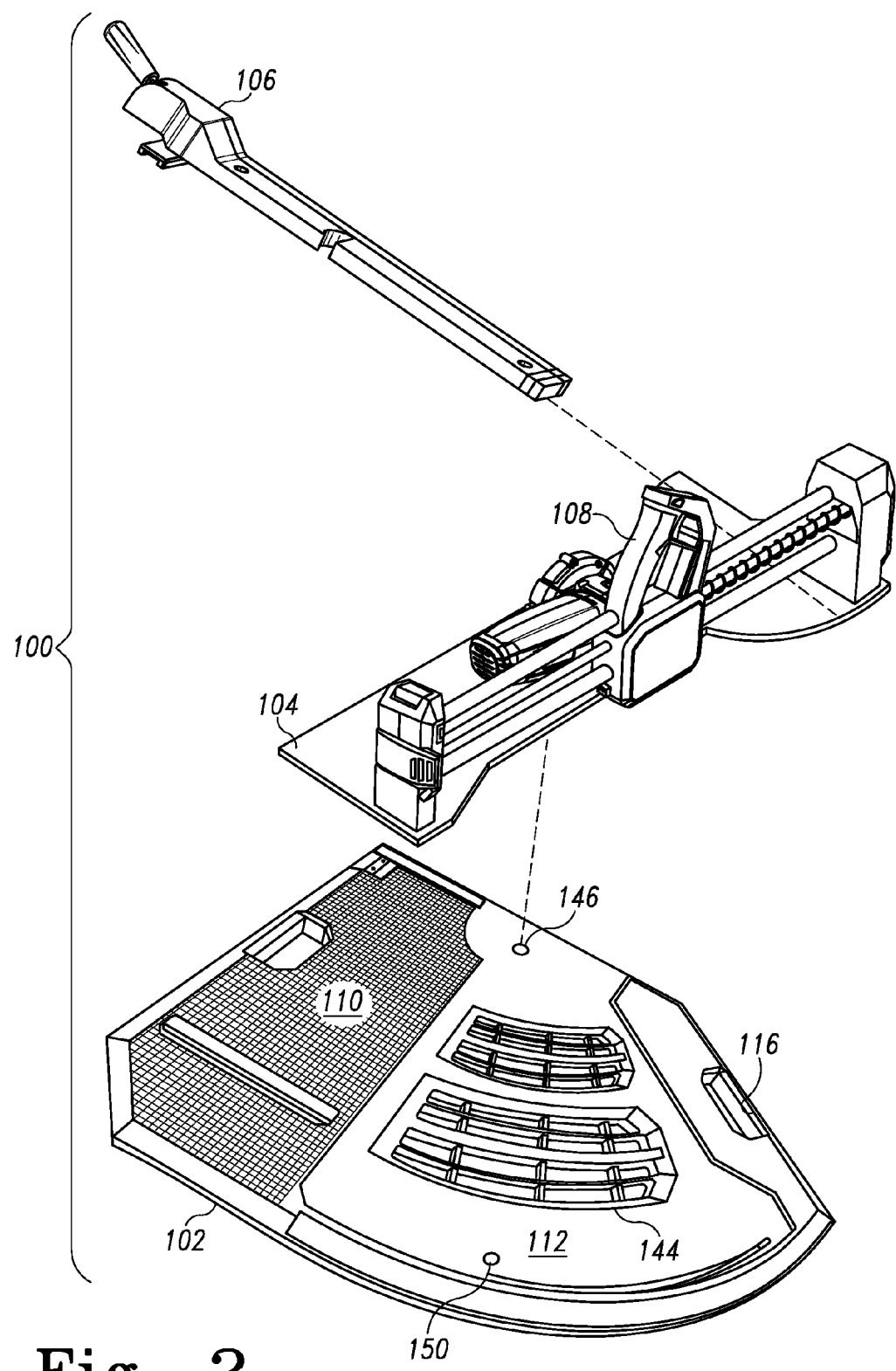
FIG. 2 depicts an exploded perspective view of the laminate flooring saw system of FIG. 1.

FIGS. 1 and 2 show a portable laminate flooring saw system 100. The system 100 includes a base 102, an articulating support structure 104 and a fence 106. A power tool 108 is supported by the support structure 104. The base 102 includes an upper table portion 110 and a sunken articulation surface 112. Two openings 114 and 116 extend through the base 102 to provide handholds. With reference to FIG. 3, a locking member 118 has an axis 120 that is substantially parallel to a rip edge 122. A locking member 124 has an axis 126 that is substantially parallel to a miter edge 128.

The sunken articulation surface 112 opens to the miter edge 128. A wall 130 on one side of the articulation surface 112 extends inwardly from the miter edge 128 and defines a recessed area 132. The articulation surface 112 terminates at a wall portion 134 at a curved edge portion 136 which includes a graduated angle indicator 138. A wall 140 extends from the sunken articulation surface 112 to the upper table portion 110. The wall 140 includes an arced portion 142. A number of evacuation ports 144, a pivot opening 146 and a guide slot 148 extend through the base 102 from the sunken articulation surface 112. A lock bore 150, which in this embodiment also extends through the base 102, is located proximate to the curved edge portion 136.

The fence 106 is shown in FIG. 4. The fence 106 includes a main body 152 and a shaft 154. The shaft 154 includes two dog holes 156 and 158. The dog holes 156 and 158 may be used to attach accessories to the portable saw system 100 such as hold-down devices. One side 167 of the shaft 154 opens to a blade cutout 160 while the other side 169 does not incorporate a cutout. A locking mechanism 162 includes a movable dog 164 and a fixed dog 166. A handle 168 extends outwardly from the body 152 and is operably connected to the movable dog 164.

Figure 6:
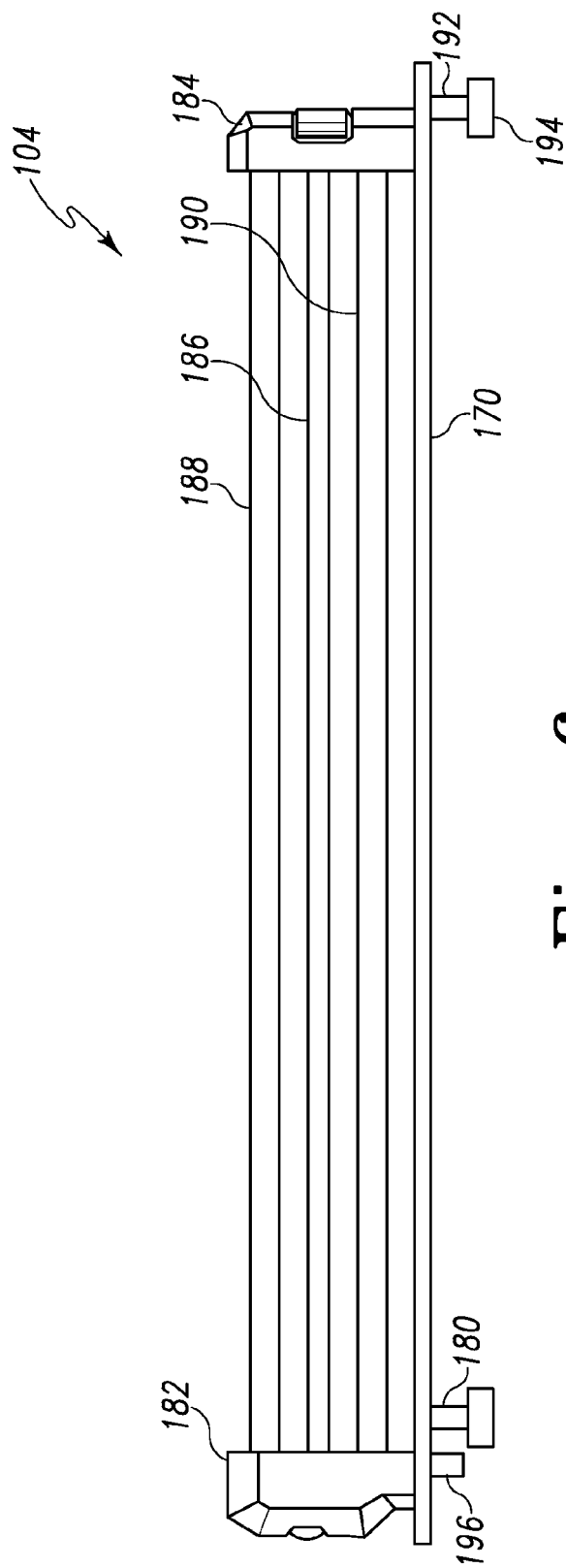
FIG. 6 depicts a side plan view of the articulating support structure of the laminate flooring saw system of FIG. 1 with a plunger in an extended position.

The articulating support structure 104 is shown in FIGS. 5 and 6 with the power tool 108 removed. The articulating support structure 104 includes an articulating base 170 with an extension 172, a support arm base portion 174 and a pivot base portion 176. A blade slot 178 extends through the articulating base 170 and is aligned with a pivot 180. A base pillar 182 is located on the support arm base portion 174 and a locking pillar 184 is located on the extension 172. A cord support arm 186 and two circular support arms 188 and 190 extend between the base pillar 182 and the locking pillar 184. A locking boss 192 with an enlarged head 194 is located beneath the locking pillar 184 and a movable plunger 196 is shown extending from the locking pillar 184 and through the articulating base 170.

Figure 7:
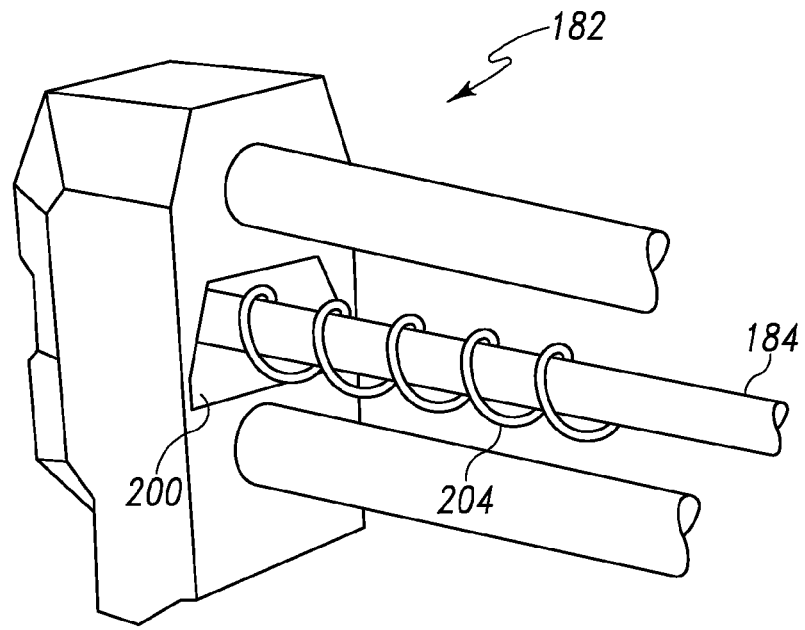
FIG. 7 depicts a side perspective view of the base pillar of the articulating support structure of the laminate flooring saw system of FIG. 1 showing a coiled power cord receptacle.
Figure 8:
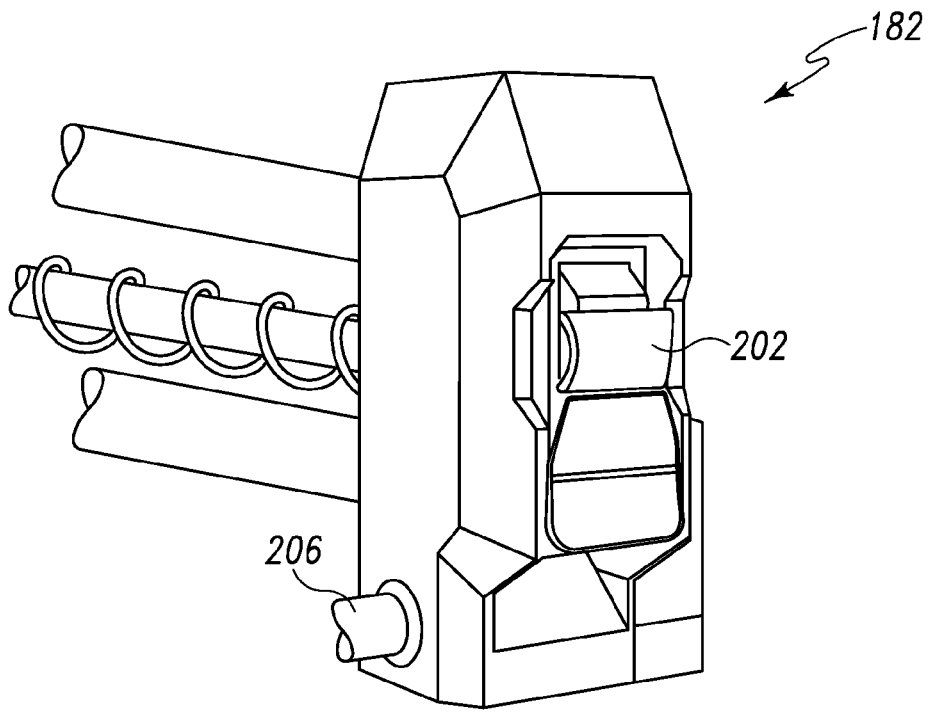
FIG. 8 depicts a side perspective view of the base pillar of the articulating support structure of the laminate flooring saw system of FIG. 1 showing a toggle switch in accordance with principles of the invention.

Referring to FIGS. 7 and 8, the base pillar 182 includes a power cord receptacle 200 and a toggle switch 202. The power cord receptacle 200 is sized to store a coiled power cord 204 which is coiled about the cord support arm 186. The cord support arm 186 extends outwardly from the receptacle 200. An external power cord 206 is received into the base pillar 182.

Figure 9:
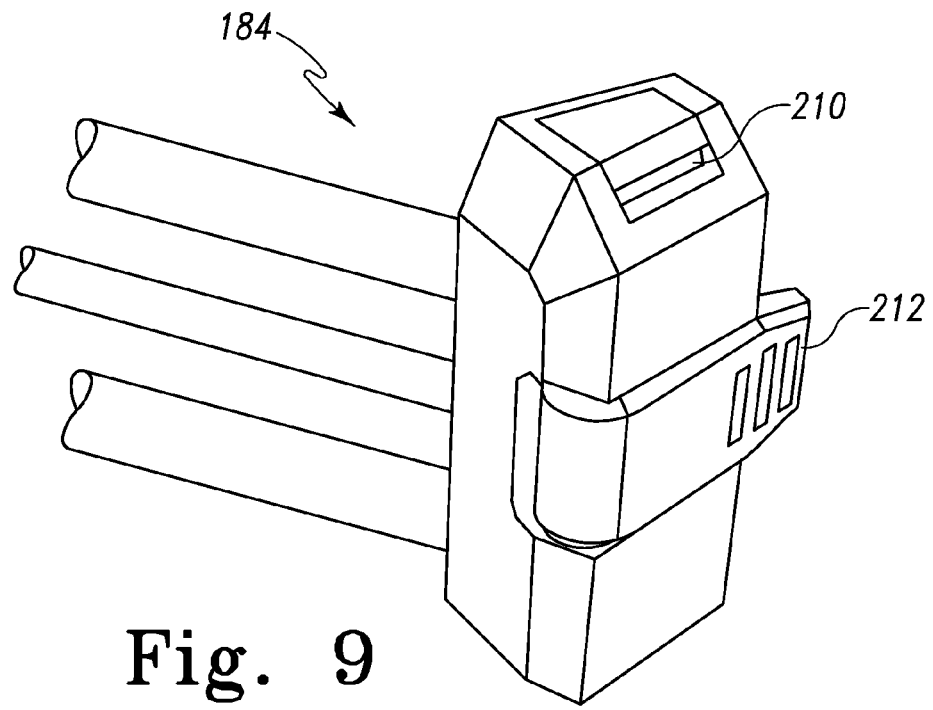
FIG. 9 depicts a side perspective view of the locking pillar of the articulating support structure of the laminate flooring saw system of FIG. 1 showing a rip lock button and a miter lock arm.
Figure 10:
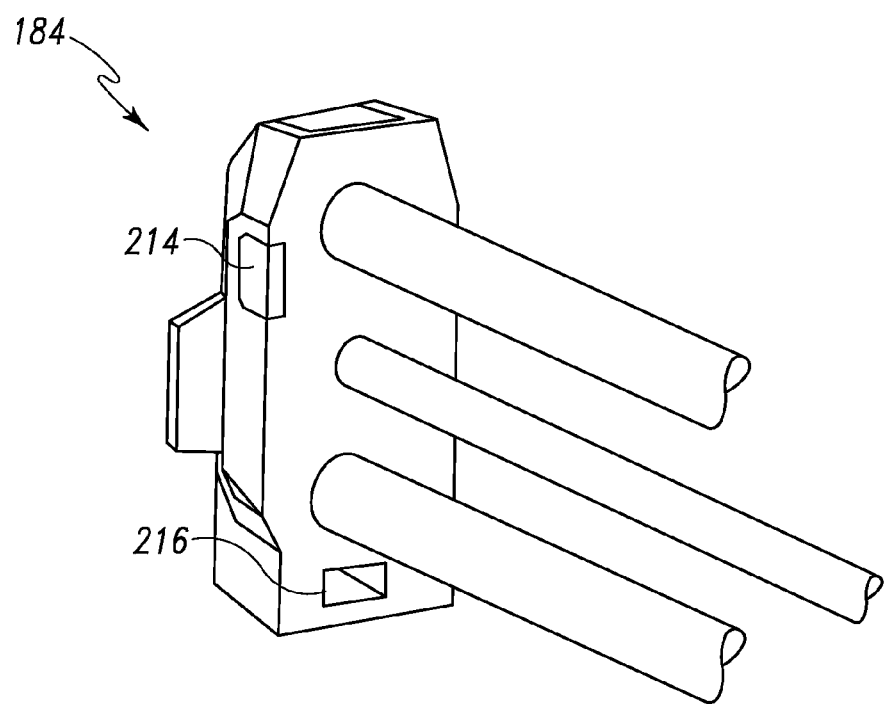
FIG. 10 depicts a side perspective view of the locking pillar of the articulating support structure of the laminate flooring saw system of FIG. 1 showing a rip lock release button and a female A/B switch member.

The locking pillar 184 is shown in FIGS. 9 and 10. A rip lock button 210 is located on the top of the locking pillar 184 and a miter lock arm 212 is located on the outer side of the locking pillar 184. The locking pillar 184 further includes a rip lock release button 214 and a keyed female A/B switch member 216.

Figure 11:
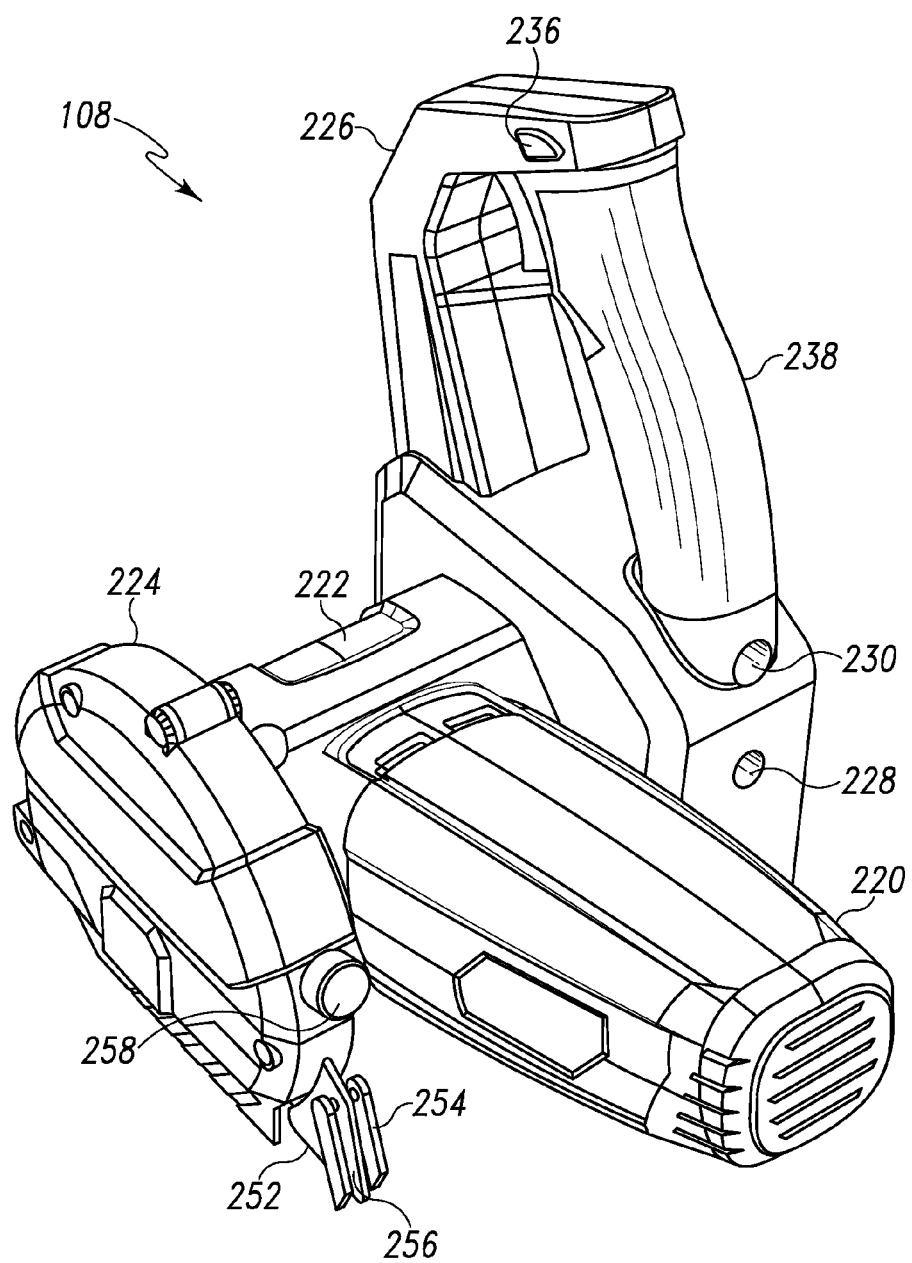
FIGS. 11-13 depict various perspective views of the power tool of the laminate flooring saw system of FIG. 1.
Figure 12:
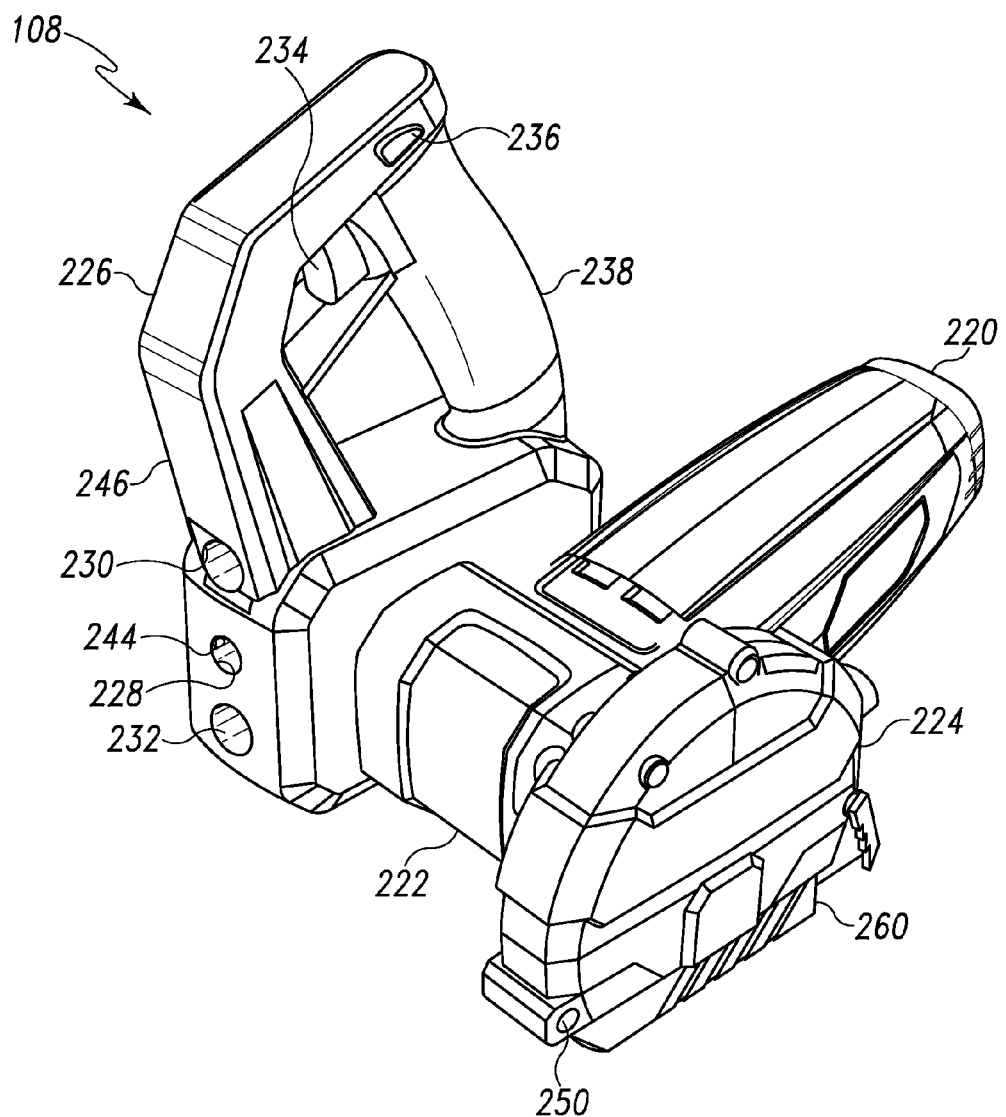
Figure 13:
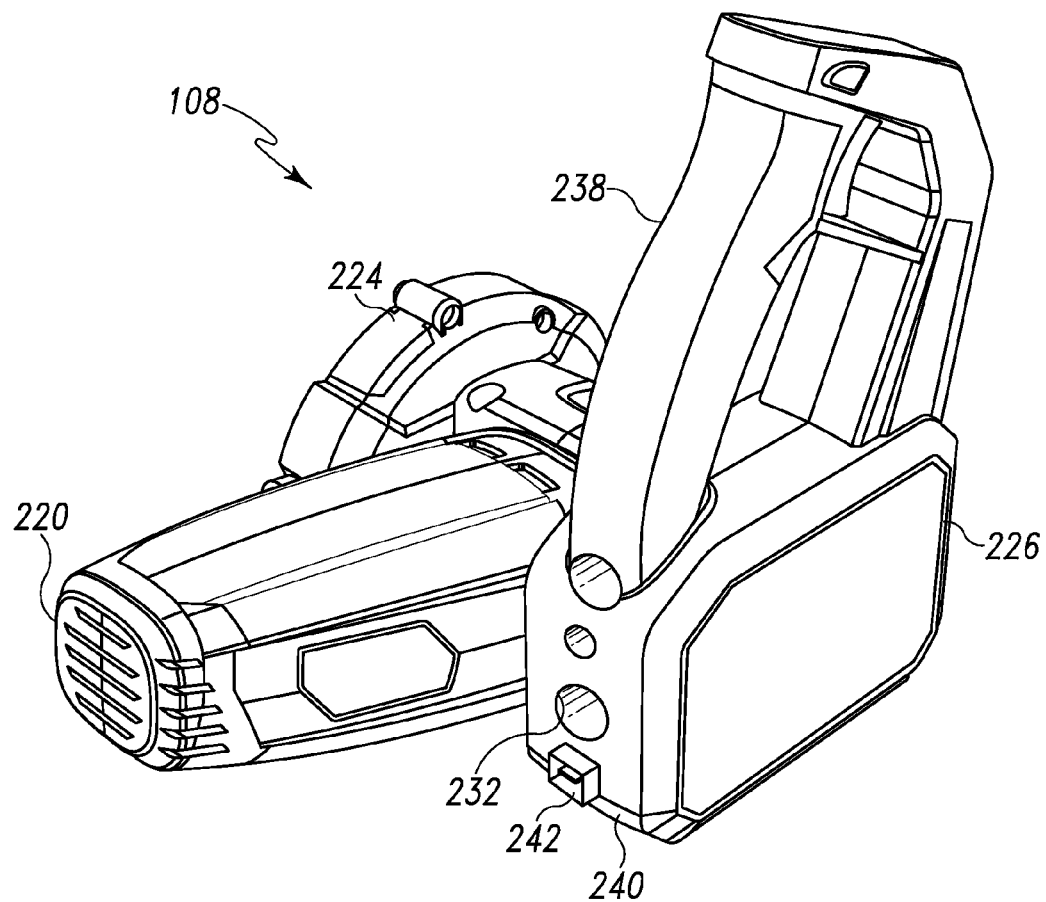

FIGS. 11, 12 and 13 show the power tool 108 removed from the cord support arm 186 and the two circular support arms 188 and 190. The power tool 108 in this embodiment is a circular saw including a motor housing 220, a gear box 222, a blade guard 224 and a handle housing 226. The handle housing 226 includes three bores 228, 230 and 232 sized to receive the cord support arm 186 and the two circular support arms 188 and 190, respectively. A momentary power switch 234 and a lockout switch 236 extend out of the handle housing 226 and a grip 238 is located at the rear 240 of the handle housing 226. A keyed male A/B switch 242 is located below the bore 232 at the rear 240 of the housing 226. The coiled power cord 204 is received by a power port 244 located at the front portion 246 of the handle housing 226.

The blade guard 224 is configured to receive a blade (not shown) operably connected to the power tool 108. A connection member 250 located at the forward portion of the blade guard 224 is provided for attachment of a hold-down bracket (not shown) and two kick-back pawls 252 and 254 are located on a positionable riving knife 256 located at the rear of the blade guard 224 below a riving knife locking knob 258. An extension 260 is pivotably attached to the lower portion of the blade guard 224.

Figure 14:
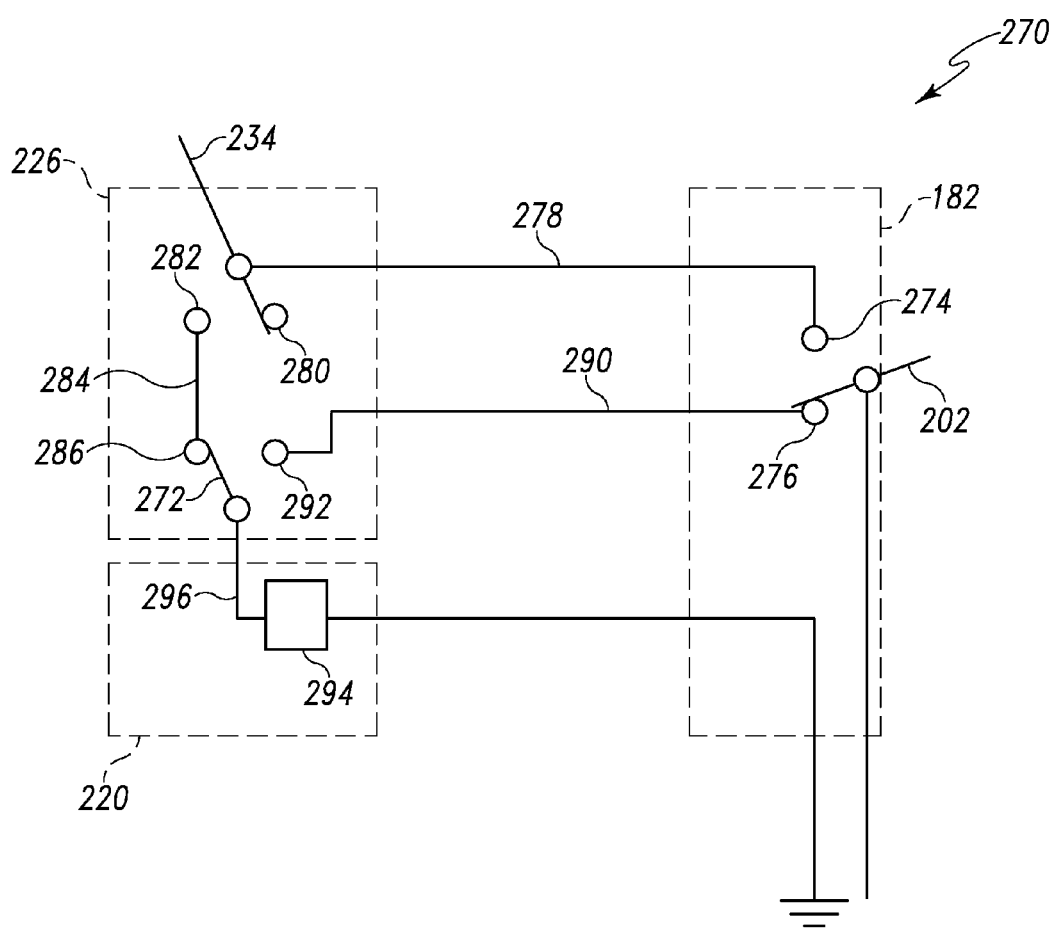
FIG. 14 shows a schematic diagram of the electrical control circuit used to alternatively enable use of a momentary power switch for making miter cuts and a toggle switch for making rip cuts in accordance with principles of the invention.

A schematic of the electrical system 270 of the portable saw system 100 is shown in FIG. 14. The electrical system 270 includes the toggle switch 202 which extends from the base pillar 182, the momentary switch 234 which extends from the handle housing 226 and a selector or A/B switch 272 which, in this embodiment, is located in the handle housing 226. The toggle switch 202 is positionable to apply energy to either a terminal 274 or a terminal 276.

The terminal 274 is connected through a lead 278 to the momentary switch 234. The momentary switch 234 is biased to contact a terminal 280 which is electrically isolated. By application of pressure, the momentary switch 234 can be positioned to contact a terminal 282 which is connected by a lead 284 to a terminal 286 associated with the A/B switch 272. The terminal 276 associated with the toggle switch 202 is connected by a lead 290 to a second terminal 292 associated with the A/B switch 272. The A/B switch 272, which is biased to contact the terminal 286, is connected to a motor 294 in the motor housing 220 by a lead 296.

Figure 15:
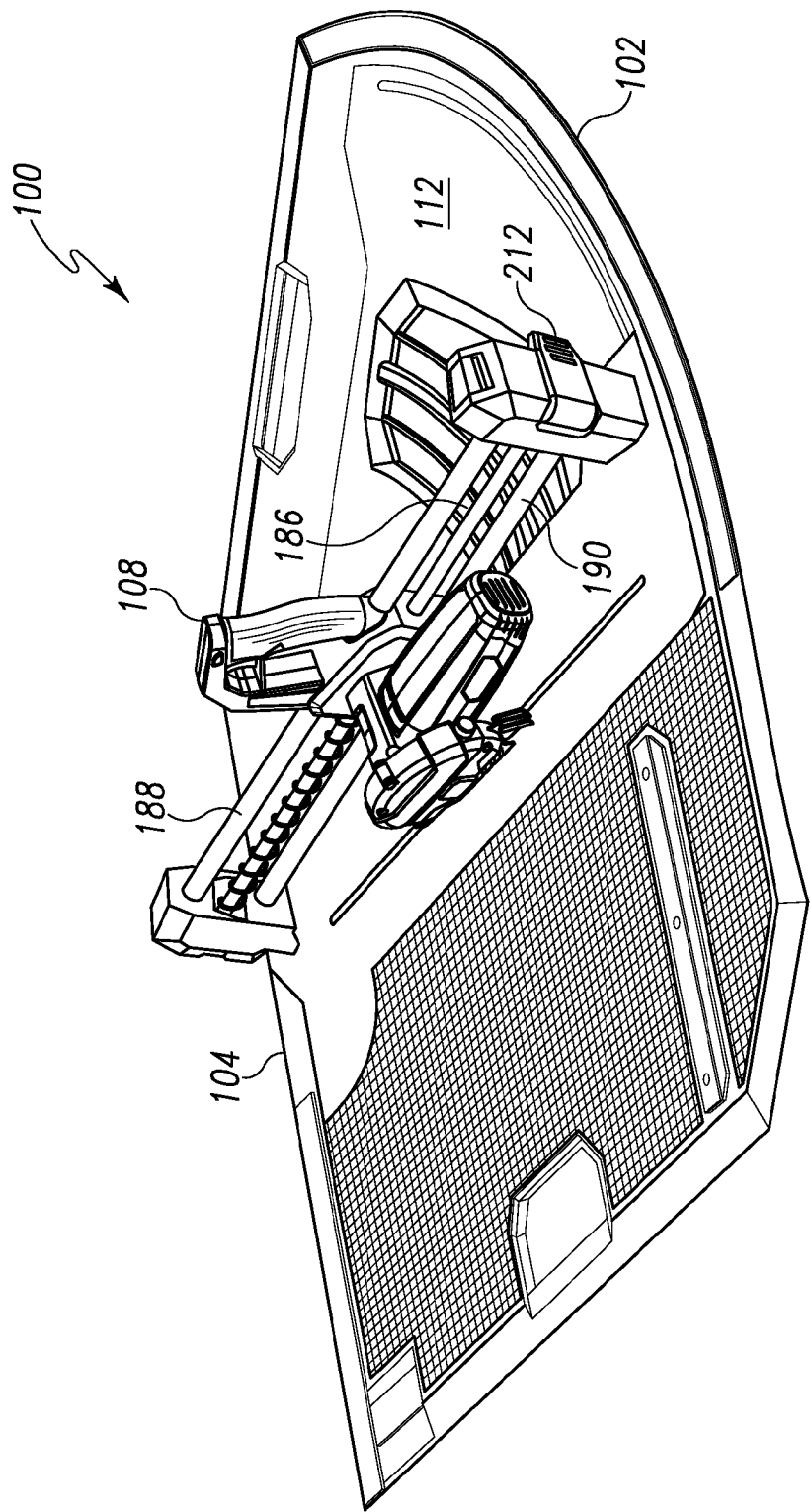
FIG. 15 depicts a top perspective view of the laminate flooring saw system of FIG. 1 with the fence removed.

The portable saw system 100 may be operated in accordance with the following examples. In one example, operation of the portable saw system 100 begins with the fence 106 removed as shown in FIG. 15. With reference to FIGS. 1-6, the articulating base 170 of the articulating support structure 104 is positioned on the sunken articulation surface 112. The pivot 180 extends through the pivot opening 146 and the locking boss 192 extends through the guide slot 148. The miter lock arm 212 is positioned against the locking pillar 184, thereby locking the articulating support structure 104 on the base 102. While a number of variations are possible, the miter lock arm 212 in this embodiment pulls the enlarged head 194 of the locking boss 192 (see FIG. 6) upwardly against the base 102 as the miter lock arm 212 is pivoted toward the locking pillar 184.

With further reference to FIGS. 11-13, the power tool 108 is slidably mounted on the articulating support structure. Specifically, the circular arm 188 slidably extends through the bore 230, the circular arm 190 slidably extends through the bore 232 and the power cord support arm 186 slidably extends through the bore 238. When so positioned, the saw blade (not shown) attached to the power tool 108 extends into the blade slot 178 while the extension 260 is pivotably biased against the articulating base 170. Thus, no portion of the saw blade (not shown) is exposed to a user.

With the portable saw system 100 in this configuration, the operator determines the type of cut that is needed on a work-piece. In the event that the operator desires to perform a rip cut on a work-piece, the fence 106 is positioned on the base 102 with the locking mechanism 162 positioned over the locking member 124 and the handle 168 in a raised position as shown in FIG. 4. Once the fence 106 is positioned along the locking member 124 at a location corresponding the to desired width of the work-piece, the handle 168 is moved in a downwardly direction from the position shown in FIG. 4 to the position shown in FIG. 16, thereby moving the movable dog 164 against the locking member 124 so as to clamp the locking member 124 between the movable dog 164 and the fixed dog 166. Thus, the side 169 of the shaft 154 defines a guide axis perpendicular to the axis 126 associated with the locking member 124 (see FIG. 3). In alternative embodiments, a handle may move a member located between two dogs to clamp the fence.

Figure 16:
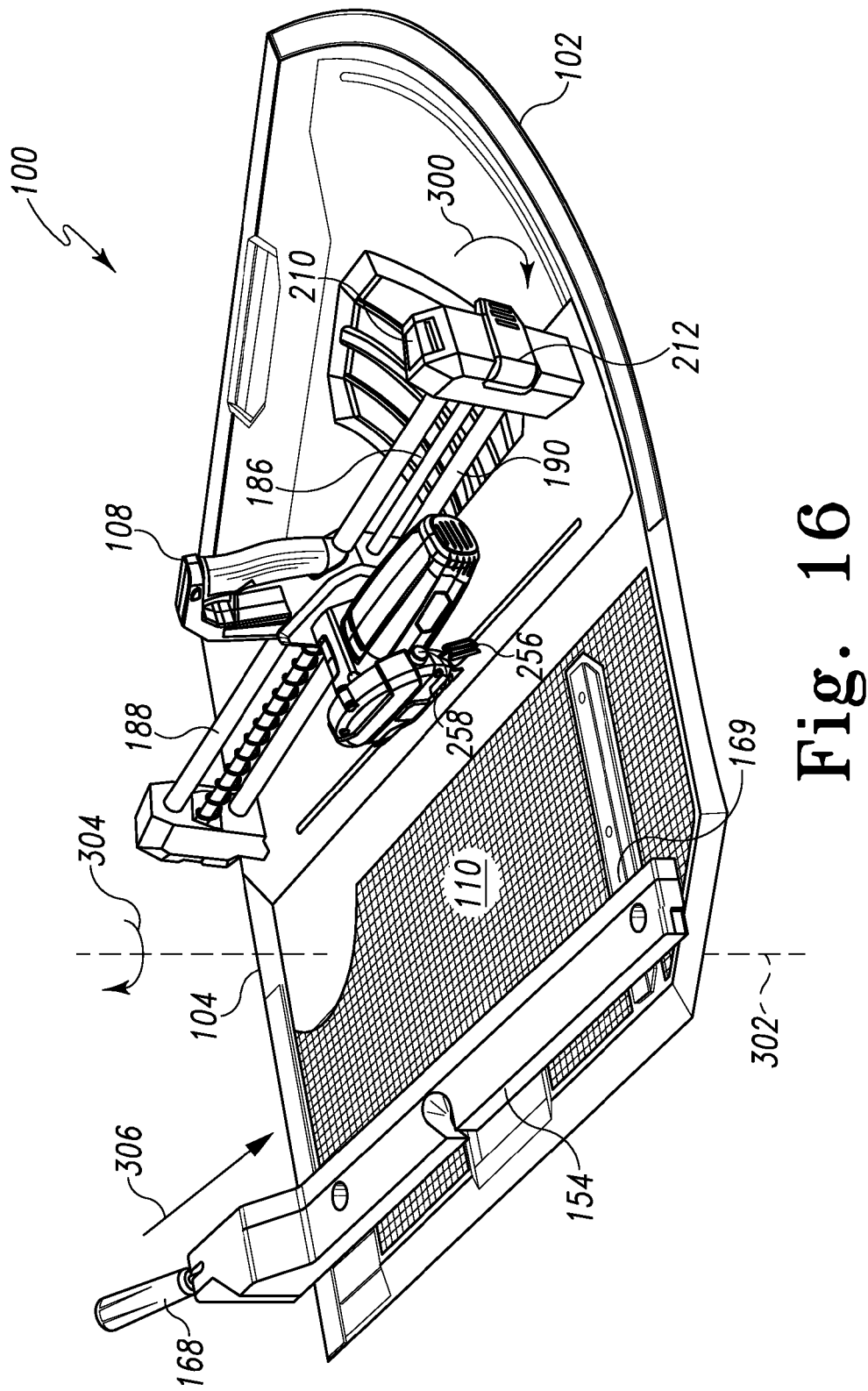
FIG. 16 depicts a top perspective view of the laminate flooring saw system of FIG. 1 with the fence and the articulating support structure positioned for making a rip cut in accordance with principles of the invention.

Next, the articulating support structure 104 is unlocked from the base 102 by movement of the miter lock arm 212 in the direction of the arrow 300 in FIG. 16. The articulating support structure 104 is then pivoted about the pivot axis 302 defined by the pivot 180 in the direction of the arrow 304 until the articulating support structure 104 abuts the wall 140. The articulating support structure 104 is then locked into position by movement of the miter lock arm 212 in the direction opposite the arrow 300 in FIG. 16, thereby pulling the enlarged head 194 against the base 102.

Positioning the articulating support structure 104 against the wall 140 places the circular arms 188 and 190 in a position parallel to the shaft 154. Additionally, the plunger 196 is aligned with the locking bore 150. The plunger 196 is then extended into the locking bore 150 by depressing the spring loaded rip lock button 210. As the plunger 196 extends into the locking bore 150, the rip lock release button 214 automatically engages the plunger 196 locking the plunger 196 within the locking bore 150.

Depression of the rip lock button 210 further causes the female A/B switch member 216 to be configured to accept the male A/B switch member 242. The power tool 108 may then be slid along the circular arms 188 and 190 until the male A/B switch member 242 enters the female A/B switch member 216. To ensure the power tool 108 is not accidentally energized during this movement, the lockout switch 236 may be depressed. Depression of the lockout switch 236 locks the momentary power switch 234 into contact with the electrically isolated terminal 280 (see FIG. 14).

Continuing with FIG. 14, as the male A/B switch member 242 enters the female A/B switch member 216, the A/B switch 272, which is biased toward the terminal 286, is forced away from the terminal 286 and into contact with the terminal 292. Accordingly, the motor 294 may be energized by movement of the toggle switch 202 into contact with the terminal 276.

Returning to FIG. 16, prior to energizing the portable tool 108, the riving knife 256 and the kick-back pawls 252 and 254 are positioned and secured using the riving knife locking knob 258. The portable saw system 100 may then be energized by positioning the toggle switch 202 into contact with the terminal 276 and a work-piece fed onto the upper table portion 110 along the fence 104 in the direction of the arrow 306. As the work-piece engages the extension 260, the extension 260 is pivoted upwardly away from the articulating base 170 exposing the work-piece to the saw blade (not shown). As the work-piece passes by the saw blade (not shown), the riving knife 256 spreads the cut portions of the work-piece to prevent binding of the saw blade (not shown) by the work-piece.

Additionally, the work-piece is positioned underneath the kick-back pawls 252 and 254 as the work-piece passes the saw blade. Accordingly, in the event that the work-piece is forced away from the articulating base 170, the work-piece would contact the kick-back pawls 252 and 254. This would generate a torque on the power tool 108. The power tool 108, however, is prevented from rotation away from the articulating base 170 by the spacing of the circular arms 188 and 190. Accordingly kick-back of the work-piece is prevented as is undesired movement of the power tool 108 away from the articulating base 170.

To switch from rip cutting mode to a miter cutting mode after the saw is de-energized, the fence 106 is removed by moving the handle 168 in an upwardly direction from the position shown in FIG. 16 to the position shown in FIG. 4. This moves the movable dog 164 away from the locking member 124, allowing the fence 106 to be lifted off of the base 102.

Figure 17:
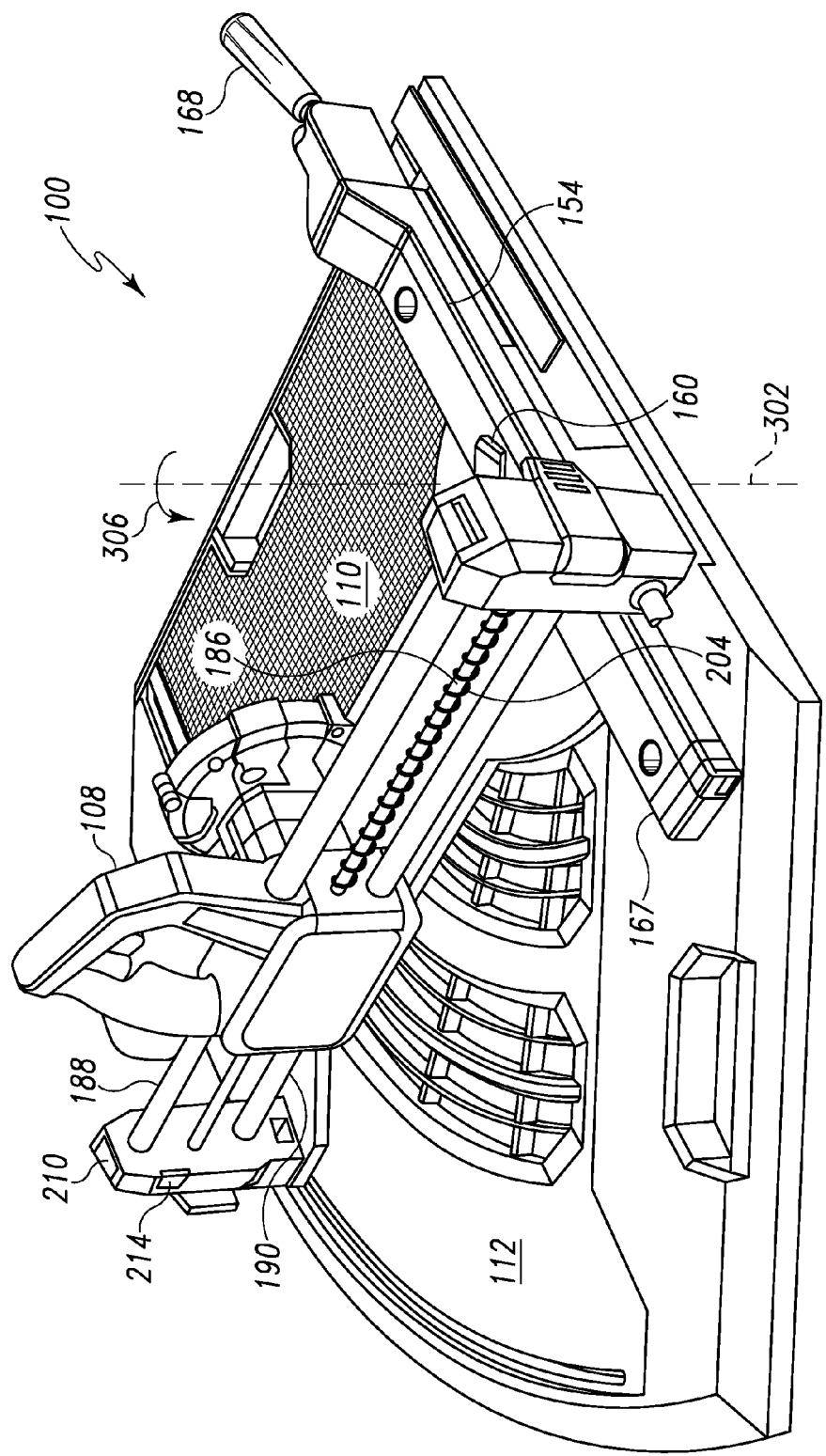
FIG. 17 depicts a top perspective view of the laminate flooring saw system of FIG. 1 with the fence positioned for making a miter cut and the articulating support structure positioned to make a ninety degree miter cut in accordance with principles of the invention.

Next, the fence 106 is positioned on the base 102 with the locking mechanism 162 positioned over the locking member 118. Once the fence 106 is positioned on the locking member 118, the handle 168 is moved in a downwardly direction from the position shown in FIG. 4 to the position shown in FIG. 17 thereby moving the movable dog 164 against the locking member 118 so as to clamp the locking member 118 between the movable dog 164 and the fixed dog 166. Thus, the side 167 of the shaft 154 defines a guide axis perpendicular to the axis 120 associated with the locking member 118 (see FIG. 3).

Next, the articulating support structure 104 is unlocked from the base 102 by sliding the power tool 108 along the circular arms 188 and 190 away from the locking pillar 184 until the male A/B switch member 242 exits the female A/B switch member 216. To ensure the power tool 108 is not accidentally energized during this movement, the lockout switch 236 may be depressed. Depression of the lockout switch 236 locks the momentary power switch 234 into contact with the electrically isolated terminal 280 (see FIG. 14).

Continuing with FIG. 14, as the male A/B switch member 242 exits the female A/B switch member 216, pressure from the female A/B switch member 216 is removed from the A/B switch 272. Thus, because the A/B switch 272 is biased toward the terminal 286, the A/B switch 272 is forced away from the terminal 292 and into contact with the terminal 286. Accordingly, the motor 294 may only be energized by movement of the toggle switch 202 into contact with the terminal 274 and movement of the momentary power switch 234 into contact with the terminal 282.

Movement of the male A/B switch member 242 out from the female A/B switch member 216 further allows the plunger 196 to be withdrawn. This is accomplished by depressing the rip lock release button 214 which releases the rip lock button 210. With the rip lock release button 214 depressed, a spring (not shown) biases the rip lock button 210 in an upwardly direction, thereby withdrawing the plunger 196 from the locking bore 150. Movement of the plunger 196 out of the locking bore 150 causes the female A/B switch member 216 to be configured to not accept the male A/B switch member 242.

In the event that a ninety degree miter cut is desired, the articulating support structure 104 need not be repositioned. If a different angle is desired, the articulating support structure 104 is positioned to the desired angle by swinging the miter lock arm 212 in the direction of the arrow 300 in FIG. 16. This moves the enlarged head 194 away from the base 102. The articulating support structure 104 is then pivoted about the pivot axis 302 defined by the pivot 180 in the direction of the arrow 306 until the articulating support structure 104 is at the desired angle. The graduated angle indicator 138 may be used to assist in positioning the articulating support structure 104.

In this embodiment, when the articulating support structure 104 is positioned with the extension 172 fully positioned within the recessed portion 132, a 45 degree miter cut may be executed on a work-piece. Thus, the articulating support structure 104 can be positioned to provide a miter cut at any desired angle between 45 degrees and 90 degrees. Additionally, because the portable saw system 100 is configured to align a saw blade held by the power tool 108 with the blade slot 178, the cutting axis of the power tool 108 is aligned with the pivot 180 throughout the range of motion of the articulating support structure 104.

Once the articulating support structure 104 is in the desired position, the miter lock arm 212 is pivoted in the direction opposite the arrow 300 in FIG. 16 thereby pulling the enlarged head 194 against the base 102 to lock articulating support structure 104 at the desired position.

Prior to performing a miter cut, the riving knife 256 and the kick-back pawls 252 and 254 are moved away from the articulating base 170 and secured using the riving knife locking knob 258. Additionally, a hold down clamp may be attached to the blade guard 224 using the connection member 250. After setting the height of the hold down clamp as desired, a work-piece is positioned on portable saw system 100. Specifically, the work-piece is positioned against the shaft 154 of the fence 106 and upon the top of the articulating base 170. Depending upon the particular cut and work-piece, the work-piece may also extend onto the upper table portion 110. To facilitate placement of a work-piece across both the articulating base 170 and the upper table portion 110, the height of the articulating base 170 is substantially the same as the height of the wall 140.

The portable saw system 100 may then be energized by positioning the toggle switch 202 into contact with the terminal 274 and depressing the momentary power switch 234 thereby placing the momentary power switch 234 into contact with the terminal 282. With the power tool 108 energized, the operator slides the power tool 108 along the circular arms 188 and 190 toward the fence 106.

As the power tool 108 moves toward the fence 106, the coiled power cord 204 is gathered into the power cord receptacle 200 to ensure the power cord 204 does not contact the work piece or the power tool 108. Additionally, as the extension 260 engages the work-piece, the extension 260 is pivoted upwardly away from the articulating base 170 exposing the work-piece to the saw blade (not shown).

As discussed above, the cutting axis defined by the power tool 108 is aligned with the pivot 180. In order to provide a consistent cut location on a work-piece with respect to the base 102, the pivot opening 146 is positioned such that the axis 302 intersects the guide axis defined by the fence 106 when the fence 106 is locked to the locking member 118. Accordingly, the saw blade (not shown) will cross the guide axis at the same location regardless of the miter angle. So as to allow the entire width of a work-piece to be cut, the blade cutout 160 is positioned and shaped to allow the saw blade to cross the guide axis defined by the side 167.

Figure 18:
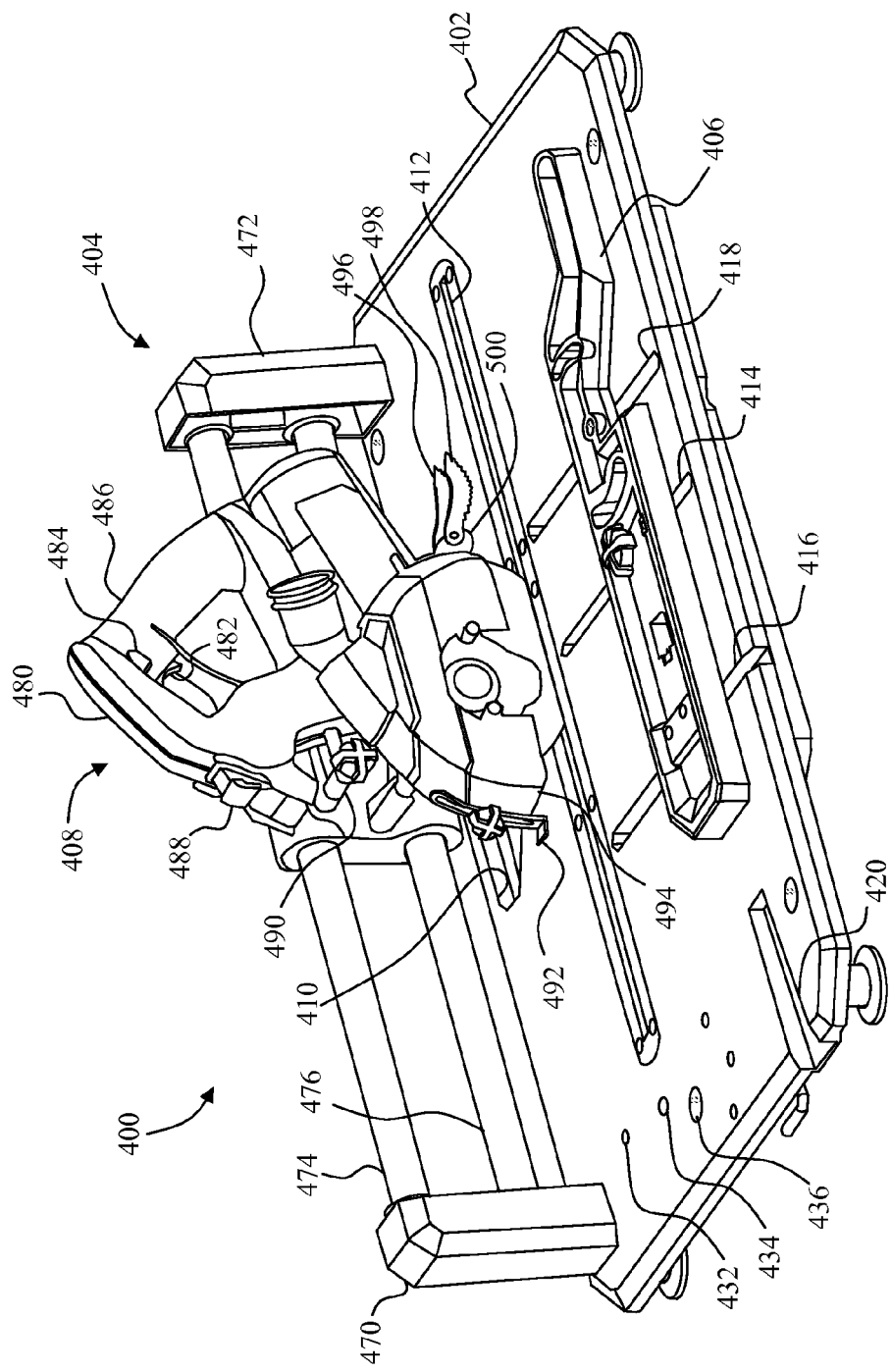
FIG. 18 depicts a perspective view of a laminate flooring saw system in accordance with principles of the present invention.
Figure 19:
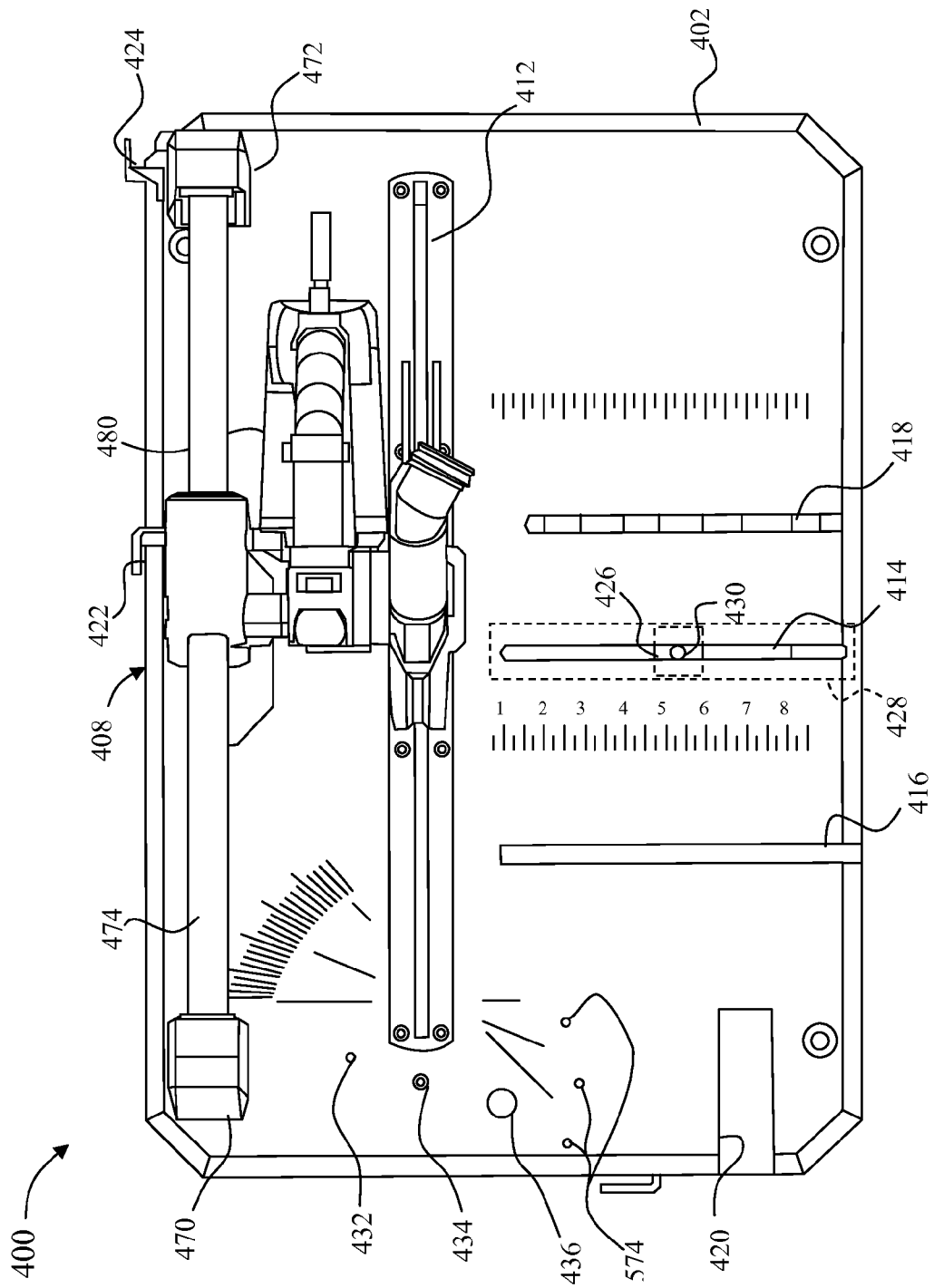
FIG. 19 depicts a top plan view of the laminate flooring saw system of FIG. 18.

FIGS. 18 and 19 show a portable laminate flooring saw system 400. The system 400 includes a base 402, a support structure 404 and a fence 406. A power tool 408 is supported by the support structure 404. The base 402 includes a handhold 410, a blade slot 412, a locking slot 414, an alignment slot 416, a clearance slot 418, and a recessed portion 420. Two cord guides 422 and 424 are located at a rear portion of the base 402. A threaded nut 426 is slidably positioned within a channel 428 such that a threaded bore 430 of the threaded nut 426 is accessible from the top of the base 402. A threaded lock bore 432, a pivot guide 434, and a hold-down locking bore 436 are located at one end of the blade slot 412.

The fence 406 is shown in FIGS. 20 and 21. The fence 406 includes a shaft 440 and an extension 442. One side 444 of the shaft 440 opens to a blade cutout 446 while the other side 448 does not incorporate a cutout. A locking guide 450 and a hold-down guide 452 are located on opposite sides of a pivot 454 which extends from the bottom 456 of the shaft 440. A spring loaded ball 458 and a guide block 460 also extend outwardly from the bottom 456 of the shaft 440 and a pointer 462 extends into a positioning window 464 which extends completely through the shaft 440. A threaded locking pin 466 is shown in FIGS. 20 and 21 extending through a locking bore 468.

Returning to FIGS. 18 and 19, the support structure 404 includes two base pillars 470 and 472 which support two support bars 474 and 476. The power tool 408, which in the embodiment of FIG. 18 is a laminate saw, is slidably supported on the support bars 474 and 476 by a housing 480. A momentary power switch 482 and a lockout switch 484 extend out of the housing 480 which further defines a grip 486. A bump switch 488 is located at a forward end of the grip 486 and a selector switch operating mechanism 490 is located below the bump switch 488. A hold-down bracket 492 is located at a forward end portion of a blade guard 494 and two kick-back pawls 496 and 498 are located on a riving knife 500 located at the rear of the blade guard 494.

Figure 22:
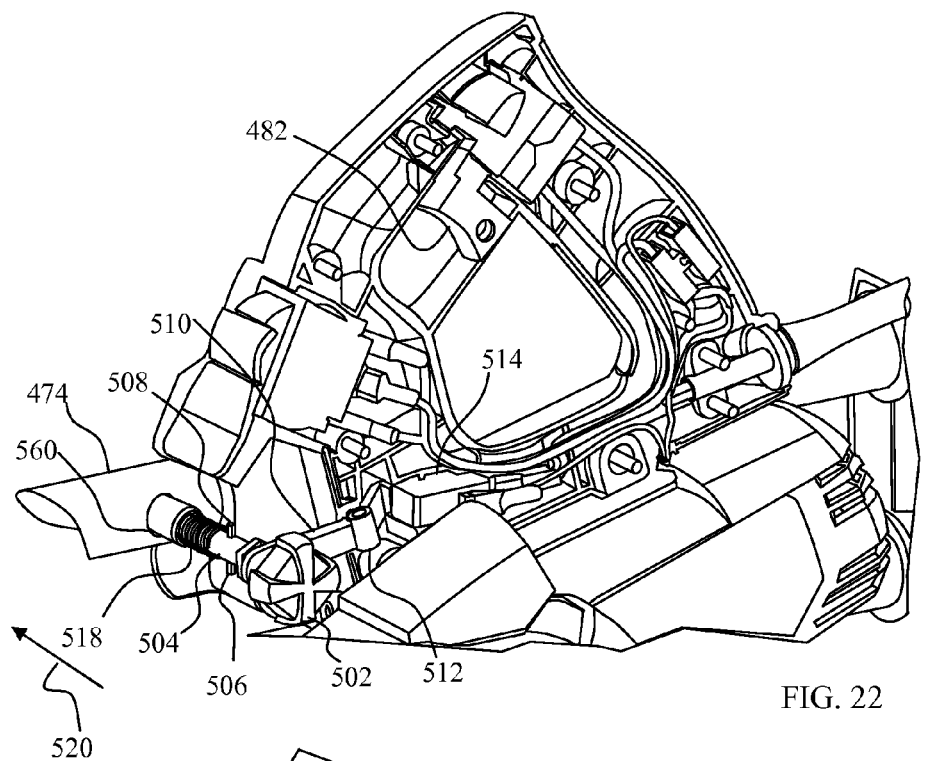
FIG. 22 depicts a partial cutaway perspective view of the power tool of the laminate flooring saw system of FIG. 18 including various electrical components.
Figure 23:
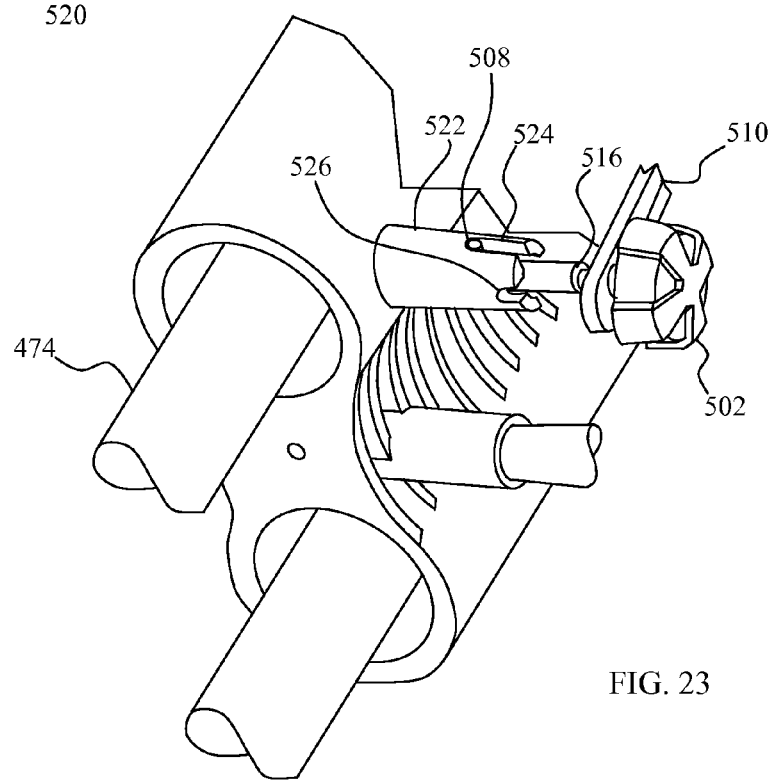
FIG. 23 depicts a partial cutaway perspective view of the selector switch operating mechanism of the laminate flooring saw system of FIG. 18.

The selector switch operating mechanism 490, also shown in FIGS. 22 and 23, includes a knob 502, a shaft 504, and two tabs 506 and 508. A lever arm 510 includes a pivot 512. One end of the lever arm 510 is operably connected to a selector switch 514 and the other end of the lever arm 510 is trapped between a shoulder 516 on the shaft 504 and the knob 502. A spring 518 biases the shaft 504 in the direction of the arrow 520 of FIG. 22. Movement of the shaft 504 in the direction of the arrow 520 is constrained by a slotted housing portion 522. The slotted housing portion 522 includes a pair of deep slots 524 (only one is shown) and a pair of shallow slots 526 (only one is shown).

In operation, the tabs 506 and 508 are aligned by an operator with either the deep slots 524 or the shallow slots 526. Specifically, if the saw system 400 is to be used in a cross-cut mode, the tabs 506 and 508 are aligned with the shallow slots 526. The spring 518 then forces the tabs 506 and 508 into the shallow slots 526. Movement of the shaft 504 and the entrapped end of the lever arm 510 in the direction of the arrow 520, however, is limited by the end of the shallow slots 526. The depth of the shallow slots 526 is selected, in conjunction with the length of the shaft 504, to maintain the shaft 504 at a location spaced apart from the support bar 474. Accordingly, the power tool 408 is allowed to slide along the support bars 474 and 476 as described in further detail below.

Figure 24:
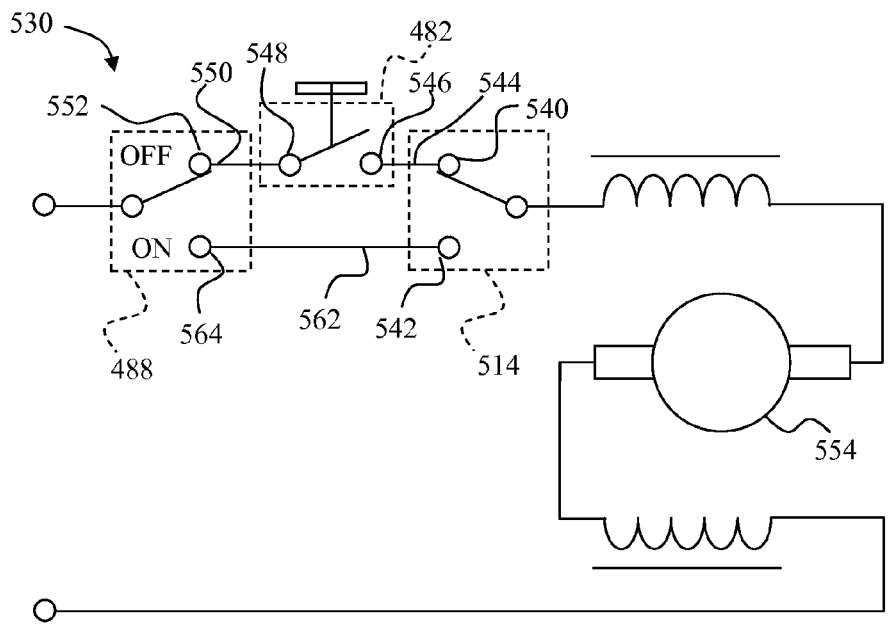
FIG. 24 shows a schematic diagram of the electrical control circuit used to alternatively enable use of a momentary power switch for making miter cuts and a bump switch for making rip cuts in accordance with principles of the invention.

Additionally, the lever arm 510 is only allowed to pivot so as to position the selector switch 514 in a position that provides energy to the momentary power switch 482 as described with further reference to FIG. 24, which is a schematic of the electrical system 530 of the portable saw system 400. The electrical system 530 includes the bump switch 488, the momentary switch 482, and the selector switch 514.

The selector switch 514 is positionable to receive energy from either a terminal 540 or a terminal 542. When constrained by the shallow slots 526, the lever arm 510 pivots about the pivot 512 to a location whereat the selector switch 514 receives energy from the terminal 540. Terminal 540 is connected through a lead 544 to a terminal 546 in the momentary switch 482. The momentary switch 482 is biased to electrically isolate the terminal 546. By application of pressure, the momentary switch 482 can be positioned to electrically connect the terminal 546 to a terminal 548 which is connected by a lead 550 to a terminal 552 associated with the bump switch 488.

The terminal 552 is switchably connected to a power source by the bump switch 488. Specifically, when the bump switch 488 is in the "Off" position, power is supplied to the terminal 552. Accordingly, when the bump switch 488 is in the "Off" position and the shallow slots 526 constrain the selector switch 514, the electrical system 530 in the condition depicted in FIG. 24. Thus, when the momentary switch 482 is depressed by an operator, power is applied to the motor 554.

When the saw system 400 is to be used in a rip-cut mode, the tabs 506 and 508 are aligned with the deep slots 524 as depicted in FIGS. 22 and 23. The spring 518 then forces the tabs 506 and 508 into the deep slots 524. Movement of the shaft 504 and the entrapped end of the lever arm 510 in the direction of the arrow 520 is allowed to continue beyond the location allowed by the shallow slots 526 such that the end of the shaft 504 moves into a hole 560 in the support bar 474 (see FIG. 22).

The additional travel allowed by the deep slots 524 has two effects. First, movement of the power tool 408 along the support bars 474 and 476 is restrained because the shaft 504 is positioned within the hole 560. This allows the power tool 408 to be used in a rip-cut mode. Additionally, the increased travel of the shaft 504 causes the knob 502 to pivot the lever arm 510 about the pivot 512 to a greater extent than is allowed by the shallow slots 526. The increased pivoting of the lever arm 510 is sufficient to position the selector switch 514 to receive energy from the terminal 542 (see FIG. 24). The terminal 542 is connected through a lead 562 to a terminal 564 in the bump switch 488. Accordingly, repositioning the bump switch 488 to an "ON" position applies power to the terminal 564. Thus, when the bump switch 488 is positioned to the "ON" position by an operator, power is applied to the motor 554 of the power tool 408.

The fence 406 may be locked to the base 402 in a rip orientation or a cross-cut orientation in support of the operation mode selected by an operator using the selector switch operating mechanism 490. By way of example, when the operator desires to perform a rip cut, the fence 406 is positioned in the manner depicted in FIG. 18 by placing the fence 406 on the base 402 with the alignment block 460 within the alignment slot 416 and the pivot 454 within the clearance slot 418.

The alignment block 460 is sized to fit snugly within the alignment slot 416. Additionally, the pivot 454 is sized to fit snugly within the clearance slot 418. Accordingly, by positioning the alignment block 460 within the alignment slot 416 and by positioning the pivot 454 within the clearance slot 418, the side 448 is positioned parallel to the support bars 474 and 476. Since the power tool 408 is configured to rotate a blade within a plane which is parallel to the plane defined by the support bars 474 and 476, the support bars 474 and 476 define a cutting axis. Consequently, the alignment block 460 and the pivot 454 position the fence 406 with the side 448 parallel to the cutting axis. The side 448 can thus be used as a guide surface for performance of a rip cut.

Positioning the alignment block 460 within the alignment slot 416 and the pivot 454 within the clearance slot 418 has the further effect of aligning the locking bore 468 with the locking slot 414. The fence 406 may then be moved toward or away from the cutting axis to align the locking bore 468 with the threaded bore 430 of the threaded nut 426.

Once the locking bore 468 is aligned with the threaded bore 430, the locking pin 468 is threaded into the threaded bore 430. Before tightening the locking pin 468, the width of the cut may be established by moving the fence 406 toward or away from the cutting axis while the locking pin 468 causes the threaded nut 426 to slide within the channel 428. To assist in establishing the desired width, indicia may be provided on the base 402 which can be viewed through positioning window 464 and aligned with the pointer 462.

Once the fence 406 has been locked at the desired rip cut width, the selector switch operating mechanism 490 is positioned such that the tabs 506 and 508 are aligned with the deep slots 524. The spring 518 then biases the shaft 504 toward the support bar 474. If the shaft 504 is not properly aligned with the hole 560 in the support bar 474, the lever arm 510 will not be pivoted sufficiently to position the selector switch 514 to receive power from the terminal 542. Accordingly, the power tool 408 must be properly positioned on the support bars 474 and 476 before using the system 400 in a rip cut mode. Indicia may be provided on the support bars 474 and 476 to assist in aligning the shaft 504 with the hole 560.

Once the shaft 504 has moved into the hole 560, the selector switch 514 will be positioned by the lever arm 510 to receive power from the terminal 542. Accordingly, the bump switch 488 may be positioned to the "ON" position to energize the motor 554 of the power tool 408. A board or other work piece may then be placed on the base 402 and guided by the side 448 of the fence 406 to make a rip cut in the work piece.

Figure 25:
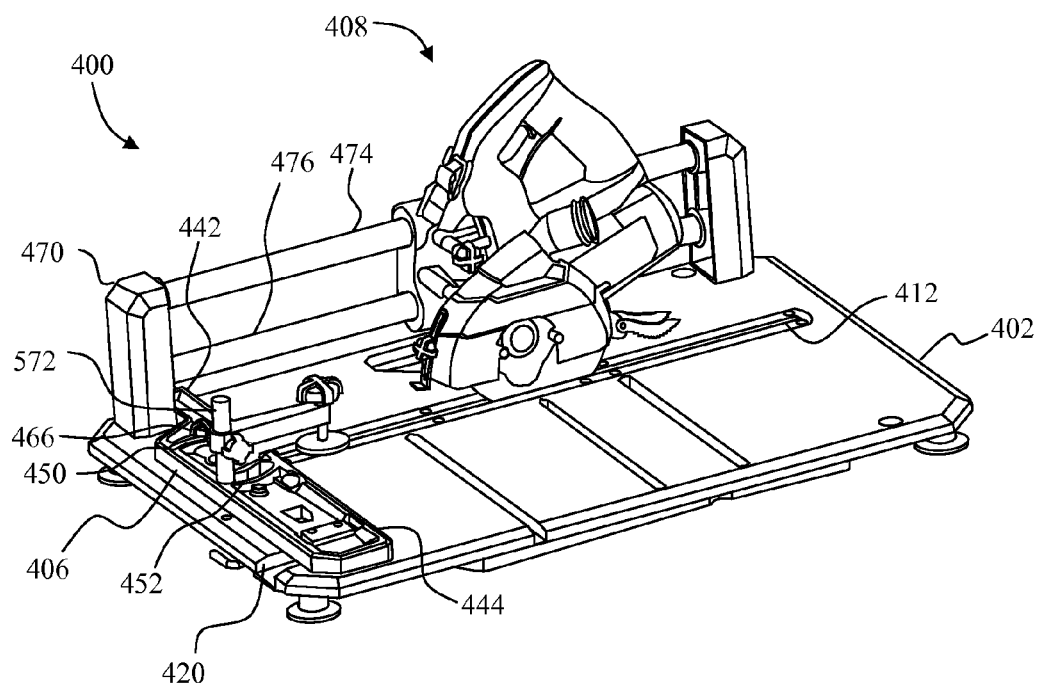
FIG. 25 depicts a perspective view of the laminate flooring saw system of FIG. 18 with the fence positioned for making a cross cut.

In the event that the operator desires to perform a cross cut, the fence 406 is positioned in the manner depicted in FIG. 25 by placing the fence 406 on the base 402 with the alignment block 460 within the recessed portion 420 and the pivot 454 within the pivot guide 434. Additionally, the extension 442 is positioned adjacent to the base pillar 470. In this position, the blade cutout 446 is aligned with the cutting axis which extends along the blade slot 412. Consequently, the side 444 can be used as a guide for a work piece.

The locking guide 450 is configured such that the threaded locking bore 432 in the base 402 is accessible through the locking guide 450 when the pivot 454 is received within the pivot guide 434. Accordingly, the threaded locking pin 466 can be inserted through the locking guide 450 and threaded into the threaded locking bore 432 once the pivot 454 is received within the pivot guide 434. Prior to tightening of the threaded locking pin 466 in the threaded locking bore 432, the fence 406 may be positioned at a desired angle. Indicia of the angle formed by the side 444 and the cutting axis may be provided on the surface of the base 402 to assist in establishing the desired angle.

Other aides may also be provided. By way of example, depressions 570 (see FIG. 19) may be provided at commonly used angles. As the fence 406 is pivoted about the pivot 512, the spring loaded ball 458 moves into the depressions 570 providing a tactile indication of the angle of the side 444 with respect to the cutting axis.

Once the desired angle is established, the threaded locking pin 466 can be tightened into the threaded locking bore 432 to lock the fence 406 to the base 402. Before or after locking the fence 406 to the base 402, a hold down device 572 may be threaded into the hold down locking bore 436 which is accessible through the hold down guide 452. A work piece is then positioned against the side 444 of the fence 406 and the hold down device 572 positioned on the upper surface of the work piece.

The power tool 408 is prepared for use as a cross cut tool by positioning the selector switch operating mechanism 490 with the tabs 506 and 508 aligned with the shallow slots 526. The spring 518 then biases the shaft 504 toward the support bar 474. The depth of the shallow slots 526 is selected to ensure that the shaft 504 does not contact the support bar 474. Accordingly, movement of the power tool 408 along the support bars 474 and 476 is not constrained.

Once the tabs 506 and 508 are positioned within the shallow slots 526, the selector switch 514 will be positioned by the lever arm 510 to receive power from the terminal 540. If desired, a mechanical interlock may be provided to ensure that the bump switch 488 is positioned to the "OFF" position when the selector switch 514 will be positioned by the lever arm 510 to receive power from the terminal 540. Alternatively, the operator may ensure that the bump switch 488 is positioned to the "OFF" position. In this configuration, power to energize the motor 554 of the power tool 408 is controlled by the momentary power switch 482.

Accordingly, an operator grasps the grip 486 and depresses the momentary power switch 482 to energize the motor 554. The power tool 408 is then pushed along the support bars 474 and 476 to perform a cross cut on the work piece. The blade cutout 446 allows the blade of the power tool 408 to make a complete cross cut through a work piece in a manner similar to the blade cutout 160.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A portable saw system comprising:
   a base including a first locking member and a second locking member;
   a support arm system defining a cutting axis;
   a power tool supported by the support arm system, the power tool having a saw blade configured to move along the cutting axis; and
   a fence with a first side defining a first guide and a second side opposite to the first side and defining a second guide,
   wherein the fence includes a cutout structure having a concave interior wall,
   wherein the concave interior wall defines a cutout recess,
   wherein the fence is (i) configured to couple with the first locking member such that the cutout recess is aligned with the cutting axis and (ii) configured to couple with the second locking member such that the second guide is parallel with the cutting axis,
   wherein the first guide includes (i) a left guide part defining a left top edge and a left bottom edge, and (ii) a right guide part defining a right top edge and a right bottom edge,
   wherein, when the fence is coupled to the first locking member, (i) the left bottom edge and the right bottom edge are juxtaposed to the base, and (ii) the left top edge and the right top edge are spaced apart from the base,
   wherein the concave interior wall defines (i) a left wall edge extending from the left top edge to the left bottom edge, (ii) a right wall edge extending from the right top edge to the right bottom edge, and (iii) an intermediate wall portion extending from the left wall edge to the right wall edge,
   wherein the left wall edge and the right wall edge collectively define an access opening leading to the cutout recess, and
   wherein when the fence is coupled to the first locking member movement of the saw blade along the cutting axis causes the saw blade to advance through the access opening and into the cutout recess.

2. The saw system of claim 1, wherein:
   the base further includes a pivot guide and a pivot slot, the pivot slot extending along a first axis perpendicular to the cutting axis; and
   the fence includes a pivot configured to fit at least partially within the pivot guide when the cutout portion is aligned with the cutting axis, and configured to fit at least partially within the pivot slot when the second guide is parallel with the cutting axis.

3. The saw system of claim 1, wherein the support arm system is fixedly attached to the base.

4. The saw system of claim 1, wherein:
   the second locking member is movable along an axis perpendicular to the cutting axis.

5. The saw system of claim 1, wherein the second locking member comprises a nut.

6. The saw system of claim 1, wherein:
the first locking member is configured to couple with the fence to lock the fence along a plurality of fence axes, each of the plurality of fence axes intersecting the cutting axis.

7. The saw system of claim 6, wherein:
the base further includes a third locking member configured to cooperate with a hold down device to lock the hold down device to the base; and
the fence further includes a hold down slot configured to receive at least a portion of the hold down device therethrough.

8. A portable saw system comprising:
a base including a first locking member and a second locking member;
a support arm system defining a cutting axis;
a power tool supported by the support arm system and movable along the cutting axis; and
a fence with a first side defining a first guide and a second side opposite to the first side and defining a second guide, wherein the first guide includes a cutout portion, the fence (i) configured to couple with the first locking member such that the cutout portion is aligned with the cutting axis and (ii) configured to couple with the second locking member such that the second guide is parallel with the cutting axis,
wherein the base further includes an alignment slot extending along an axis perpendicular to the cutting axis, and
wherein the fence further includes an alignment block configured to fit at least partially within the alignment slot when the fence is coupled with the second locking member.

9. The saw system of claim 8, wherein:
the base further includes a clearance slot extending along an axis perpendicular to the cutting axis; and
the fence further includes a pivot pin configured to fit at least partially within the clearance slot when the fence is coupled with the second locking member.

\* \* \* \* \*